(12) United States Patent
Suzuki

(10) Patent No.: US 6,868,668 B2
(45) Date of Patent: Mar. 22, 2005

(54) INTERNAL COMBUSTION ENGINE

(75) Inventor: Makoto Suzuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/192,583

(22) Filed: Jul. 11, 2002

(65) Prior Publication Data

US 2003/0010022 A1 Jan. 16, 2003

(30) Foreign Application Priority Data

Jul. 11, 2001 (JP) ....................................... 2001-211424
Aug. 8, 2001 (JP) ....................................... 2001-241444

(51) Int. Cl.[7] ............................................... F01N 3/00
(52) U.S. Cl. ........................... 60/286; 60/278; 60/280; 60/287; 60/303; 60/39.6; 123/550; 123/551
(58) Field of Search ......................... 60/274, 278, 280, 60/286, 284, 287, 288, 300, 301, 303, 39.6; 123/550, 551

(56) References Cited

U.S. PATENT DOCUMENTS

| | | | |
|---|---|---|---|
| 4,033,123 A | | 7/1977 | Masaki et al. |
| 5,119,794 A | * | 6/1992 | Kushida et al. ............ 123/549 |
| 5,184,462 A | | 2/1993 | Schatz |
| 5,207,734 A | * | 5/1993 | Day et al. ..................... 60/278 |
| 5,353,590 A | * | 10/1994 | Pettit et al. ................... 60/274 |
| 5,373,825 A | * | 12/1994 | Stephens et al. ............ 123/549 |
| 5,398,747 A | | 3/1995 | Miaoulis |
| 5,722,588 A | * | 3/1998 | Inoue et al. ........... 237/12.3 C |
| 5,806,304 A | | 9/1998 | Price et al. |
| 5,979,160 A | * | 11/1999 | Yashiki et al. ................ 60/276 |
| 6,014,858 A | | 1/2000 | Zankowski |
| 6,266,956 B1 | * | 7/2001 | Suzuki et al. ................. 60/278 |
| 6,370,871 B2 | * | 4/2002 | Suzuki et al. ................. 60/286 |
| 6,543,412 B2 | * | 4/2003 | Amou et al. ................ 123/337 |

FOREIGN PATENT DOCUMENTS

| | | |
|---|---|---|
| DE | 3624977 A1 | 2/1988 |
| EP | 0 405 310 A2 | 6/1990 |
| EP | 0 639 698 B1 | 3/1997 |
| EP | 0 924 399 A2 | 6/1999 |
| EP | 0 924 399 A3 | 6/1999 |
| EP | 1 013 997 A2 | 6/2000 |
| EP | 1 013 997 A3 | 6/2000 |
| JP | 62 046708 | 2/1987 |
| JP | 11033414 A | 2/1999 |
| JP | 2000-186531 | 7/2000 |
| JP | 2000-186532 | 7/2000 |
| JP | 2000-186534 | 7/2000 |
| JP | 2000-240519 | 9/2000 |
| WO | WO 99/14467 | 3/1999 |

OTHER PUBLICATIONS

European Search Report dated Jan. 3, 2003.

* cited by examiner

Primary Examiner—Binh Q. Tran
(74) Attorney, Agent, or Firm—Kenyon & Kenyon

(57) ABSTRACT

Disclosed is an internal combustion engine which is to be mounted on automobiles or the like and in which an improvement has been achieved in terms of startability and combustion stability during warm-up operation. In an internal combustion engine of the type in which gas discharged from a combustion heater is introduced into an intake passage of the internal combustion engine, a fuel vaporizing glow plug is operated during the period from the starting of the internal combustion engine to the occurrence of complete explosion, whereby unburned vaporized fuel is supplied from the combustion heater to the internal combustion engine.

28 Claims, 11 Drawing Sheets

INTERNAL COMBUSTION ENGINE

BACKGROUND OF THE INVENTION

1. Field of the Invention

The present invention relates to an internal combustion engine to be mounted on automobiles or the like.

2. Description of the Related Art

Recently, regarding internal combustion engines to be mounted on automobiles or the like, there has been proposed a technique according to which a combustion heater, a rapid heater or the like is provided in order, for example, to improve the performance of the room heating device when the engine is in the cold state or to promote the warming-up of the internal combustion engine.

Known examples of the above-mentioned technique include "an internal combustion engine having a combustion heater" as disclosed in JAPANESE PATENT LAID-OPEN PUBLICATION NO. 2000-240519A, "an internal combustion engine having a lean NOx catalyst" as disclosed in JAPANESE PATENT LAID-OPEN PUBLICATION NO. 2000-186531A, "an internal combustion engine having a lean NOx catalyst" as disclosed in JAPANESE PATENT LAID-OPEN PUBLICATION NO. 2000-186531A, JAPANESE PATENT LAID-OPEN PUBLICATION NO. 2000-186532A, and JAPANESE PATENT LAID-OPEN PUBLICATION NO. 2000-186534A, and "a control device for a rapid heater" as disclosed in JAPANESE PATENT PUBLICATION(POST-EXAMINATION) NO. 5-81445B.

The internal combustion engine having a combustion engine disclosed in JAPANESE PATENT LAID-OPEN PUBLICATION NO. 2000-240519A is equipped with a combustion heater which raises the intake temperature of the internal combustion engine by introducing combustion gas generated through combustion of fuel into the intake passage of the internal combustion engine; at the time of cranking of the internal combustion engine, the quantity of heat of the combustion gas supplied from the combustion heater to the intake system is controlled by using the intake air temperature, outside-air temperature, engine temperature, etc. as parameters, whereby the in-cylinder temperature at the top dead center of the compression stroke is adjusted to a desired temperature, thereby improving the startability of the internal combustion engine.

The internal combustion engine having a lean NOx catalyst as disclosed in JAPANESE PATENT LAID-OPEN PUBLICATION NO. 2000-186531A and JAPANESE PATENT LAID-OPEN PUBLICATION NO. 2000-186534A is equipped with a combustion heater which raises the temperature of the lean NOx catalyst by introducing combustion gas generated through combustion of fuel into an exhaust passage on the upstream side of the lean NOx catalyst; when it is necessary to reduce nitrogen oxide (NOx) with the lean NOx catalyst, when it is necessary to eliminate sulfur poisoning of the lean NOx catalyst, or when it is necessary to remove exhaust particulate matters (PM) accumulated on the lean NOx catalyst, the combustion heater is operated at rich air-fuel ratio, whereby the surplus fuel component not used for combustion in the combustion heater is supplied to the lean NOx catalyst as a reducing agent.

The internal combustion engine having a lean NOx catalyst as disclosed in JAPANESE PATENT LAID-OPEN PUBLICATION NO. 2000-186532A is equipped with a combustion heater which raises the temperature of the lean NOx catalyst by introducing combustion gas generated through combustion of fuel into an exhaust passage on the upstream side of the NOx catalyst, and a mechanism which supplies a reducing agent to the lean NOx catalyst; the combustion gas of the combustion heater heats the lean NOx catalyst to a desired temperature range, and a reducing agent is supplied from the reducing agent supply mechanism to the NOx catalyst, whereby reduction of nitrogen oxide (NOx), elimination of sulfur poisoning, and removal of exhaust particulate matters are effected on the lean NOx catalyst.

In the control device for a rapid heater as disclosed in JAPANESE PATENT PUBLICATION(POST-EXAMINATION) NO. 5-81445B, a rapid heating burner composed of a vaporizing glow plug and an ignition glow plug is arranged in the intake pipe of the internal combustion engine, and a heat exchanger for effecting heat exchange between the combustion gas discharged from the rapid heating burner and the room heating air is arranged in the intake pipe on the downstream side of the rapid heating burner; when the internal combustion engine is cold-started, the high temperature gas generated through by the rapid burner is introduced into the intake air.

Since the combustion heater and the rapid heating burner are capable of highly efficient combustion, in other words, a combustion akin to complete combustion, the combustion gas discharged from the combustion heater or the rapid heating burner contains a small amount of oxygen and a large amount of carbon dioxide.

Thus, as in the case of the internal combustion engine having a combustion heater as disclosed in JAPANESE PATENT LAID-OPEN PUBLICATION NO. 2000-240519A and the control device for a rapid heater as disclosed in JAPANESE PATENT PUBLICATION (POST-EXAMINATION) NO. 5-81445B, when the combustion gas of the combustion heater or the rapid heating burner is supplied to the intake system at the start of the internal combustion engine, it is possible to raise the intake air temperature of the internal combustion engine with the heat of the combustion gas; however, a reduction in the amount of oxygen taken in the internal combustion engine involves an increase in the amount of carbon dioxide, so that the ignitionability and combustion stability of the fuel in the internal combustion engine are impaired, with the result that the startability of the internal combustion engine may deteriorate.

As in the case of the internal combustion engine having a lean NOx catalyst as disclosed in JAPANESE PATENT LAID-OPEN PUBLICATION NO. 2000-186531A and JAPANESE PATENT LAID-OPEN PUBLICATION NO. 2000-186534A, when the combustion heater is operated at a rich air-fuel ratio, soot is accumulated in the combustion heater, which may lead to a deterioration in the performance of the combustion heater. Further, when the combustion heater is operated at rich air-fuel ratio in order to supply reducing agent to the lean NOx catalyst, the surplus fuel component not used for the combustion in the combustion heater is supplied to the lean NOx catalyst as a reducing agent, which means waste of fuel for combustion in the combustion heater.

As in the case of the internal combustion engine having a lean NOx catalyst disclosed in JAPANESE PATENT LAID-OPEN PUBLICATION NO. 2000-186532A, when a reducing agent supply mechanism is provided in addition to the combustion heater, the internal combustion engine becomes rather hard to be mounted in a vehicle.

SUMMARY OF THE INVENTION

The present invention has been made in view of the above problems in the prior art. It is a first object of the present invention to provide a technique which, in an internal combustion engine mounted in a vehicle or the like, can improve the startability of the internal combustion engine and improve the combustion at the time of warm-up operation or the like. It is a second object of the present invention to provide a technique which makes it possible to supply reducing agent to an exhaust gas purifying catalyst without involving an unnecessary increase in fuel consumption amount.

To achieve the first object, the present invention adopts the following.

In accordance with the present invention, there is provided an internal combustion engine comprising:
  a fuel vaporizing unit for vaporizing a fuel through heating; and
  a vaporized fuel supply unit for supplying the fuel vaporized by the fuel vaporizing unit to an intake passage of the internal combustion engine without causing it to burn.

This invention is most characterized by the fact that fuel in an already vaporized state is supplied to the internal combustion engine without causing it to burn.

In this internal combustion engine, the fuel vaporizing unit heats fuel to vaporize it, and the vaporized fuel supply unit then supplies the fuel vaporized by the fuel vaporizing unit to the intake passage of the internal combustion engine without causing it to burn.

In this case, the fuel vaporized by the fuel vaporizing unit is supplied to the intake passage of the internal combustion engine, and then to the combustion chamber of the internal combustion engine through the intake passage. That is, vaporized fuel in the unburned state and air are supplied to the combustion chamber of the internal combustion engine.

As a result, there is no unnecessary reduction in oxygen amount in the combustion chamber of the internal combustion engine, nor is there any unnecessary increase in the amount of carbon dioxide.

The fuel vaporized through heating by the fuel vaporizing unit consists of a light component subject to evaporation and ignition; when such vaporized fuel is supplied to the intake passage of the internal combustion engine, the fuel does not easily adhere to the wall surface, etc. of the intake passage, and a relatively large amount of mixture of high inflammability is likely to be generated in the combustion chamber of the internal combustion engine. Further, when such vaporized fuel is compressed in a cylinder in the compression stroke, the vaporized fuel is partly oxidized with cool flame reaction, producing highly reactive free radicals.

Thus, by supplying fuel vaporized through heating to the internal combustion engine, a relatively large amount of mixture of high inflammability is generated in the combustion chamber of the internal combustion engine.

The time at which the vaporized fuel is to be supplied to the internal combustion engine, in other words, the time at which the fuel vaporizing unit and the vaporized fuel supply unit are operated may, for example, be during the period until the complete explosion occurs in the internal combustion engine or when the internal combustion engine is in the warm-up state.

When vaporized fuel is supplied to the internal combustion engine by the fuel vaporizing unit and the vaporized fuel supply unit during the period until the complete explosion occurs in the internal combustion engine, a relatively large amount of mixture of high inflammability is generated in the cylinder of the internal combustion engine, so that the internal combustion engine undergoes the complete explosion at an early stage. The complete explosion herein refers to a combustion state in which the internal combustion engine can operate on its own without depending on an external component such as a starter motor.

The time at which the supply of the vaporized fuel is started may, for example, be the time at which the internal combustion engine is started. The time at which the internal combustion engine is started may, for example, be the time at which the ignition switch is switched from OFF to ON or the time at which the starter switch is switched from OFF to ON; preferably, it is the time at which the starter switch is switched from OFF to ON, in other words, the time at which the cranking of the internal combustion engine is started. This is due to the fact that after the cranking of the internal combustion engine has been started, the vaporized fuel from the combustion heater is easily sucked in by the cylinder of the internal combustion engine.

When the internal combustion engine is performing warm-up operation, the combustion in the internal combustion engine is likely to be unstable; when in such a case vaporized fuel is supplied to the internal combustion engine by the fuel vaporizing unit and the vaporized fuel supply unit, a relatively large amount of mixture of high inflammability is generated in the combustion chamber of the internal combustion engine, so that the combustion in the internal combustion engine is easily stabilized.

In the internal combustion engine of the present invention, examples of the fuel vaporizing unit include a combustion heater and a glow plug.

In using a combustion heater as the fuel vaporizing unit of the present invention, if the combustion heater is equipped with a fuel vaporizing glow plug for vaporizing fuel through heating and a fuel ignition glow plug for further heating the fuel vaporized by the fuel vaporizing glow plug to burn the same, it is possible to supply the vaporized fuel from the combustion heater to the internal combustion engine by operating exclusively the fuel vaporizing glow plug, without operating the fuel ignition glow plug.

The fuel vaporizing glow plug and the fuel ignition glow plug of the combustion heater may consist of independent glow plugs; alternatively, it is also possible to use the same glow plug for both purposes, switching between the vaporization and ignition of fuel according to the magnitude of voltage applied to the glow plug.

The internal combustion engine of the present invention may consist, for example, of a compression ignition type internal combustion engine.

In a compression ignition type internal combustion engine, mixture is compressed to thereby raise its temperature to a self-ignition temperature; thus, in a state in which fuel is not easily vaporized and in which the temperature of mixture is hard to raise as in the case of the starting of the internal combustion engine or warm-up operation, the production of inflammable mixture and the production of free radicals are very effective in improving the startability and stabilizing the combustion.

Next, to achieve the second object, the present invention adopts the following.

In accordance with the present invention, there is provided an internal combustion engine comprising:
  an exhaust gas purifying catalyst arranged in an exhaust passage of the internal combustion engine;
  a fuel vaporizing unit for vaporizing fuel through heating; and
  a vaporized fuel supply unit for supplying the fuel vaporized by the fuel vaporizing unit to the upstream side of the exhaust gas purifying catalyst in the exhaust passage without burning the vaporized fuel.

This invention is most characterized by the fact that vaporized fuel is supplied to an exhaust gas purifying catalyst provided in the exhaust passage of an internal combustion engine without being burned.

In this internal combustion engine, the fuel vaporizing unit vaporizes fuel through heating, and then the vaporized fuel supply unit supplies the fuel vaporized by the fuel vaporizing unit to the upstream side of the exhaust gas purifying catalyst in the exhaust passage without burning the vaporized fuel.

In this case, the fuel vaporized by the fuel vaporizing unit is supplied to the exhaust gas purifying catalyst without being burned, so that it is possible for the exhaust gas purifying catalyst to utilize all the vaporized fuel as reducing agent.

In the internal combustion engine of the present invention, the vaporized fuel may be supplied to the exhaust gas purifying catalyst, for example, when it is necessary to reduce nitrogen oxide with the exhaust gas purifying catalyst or when it is necessary to eliminate poisoning of the exhaust gas purifying catalyst caused by a sulfur oxide.

In the internal combustion engine of the present invention, examples of the fuel vaporizing unit include a combustion heater and a glow plug.

In using a combustion heater as the fuel vaporizing unit of the present invention, if the combustion heater is equipped with a fuel vaporizing glow plug for vaporizing fuel through heating and a fuel ignition glow plug for further heating the fuel vaporized by the fuel vaporizing glow plug to burn the same, it is possible to supply the vaporized fuel from the combustion heater to the exhaust gas purifying catalyst by operating exclusively the fuel vaporizing glow plug, without operating the fuel ignition glow plug.

The fuel vaporizing glow plug and the fuel ignition glow plug of the combustion heater may consist of independent glow plugs; alternatively, it is also possible to use the same glow plug for both purposes, switching between the vaporization and ignition of fuel according to the magnitude of voltage applied to the glow plug.

When a combustion heater is used as the fuel vaporizing unit of the present invention, it is possible to supply reducing agent to the exhaust gas purifying catalyst without burning the fuel with the combustion heater, so that no soot or the like is accumulated in the combustion heater, and there is no increase in fuel consumption due to unnecessary combustion in the combustion heater.

The second object can also be achieved by an internal combustion engine equipped with an exhaust gas re-circulation device for circulating exhaust gas discharged from a combustion chamber of the internal combustion engine through an intake passage of the internal combustion engine, the internal combustion engine comprising:

an exhaust gas purifying catalyst arranged in an exhaust passage of the internal combustion engine;

a fuel vaporizing unit for vaporizing fuel through heating; and a vaporized fuel supply unit for supplying the fuel vaporized by the fuel vaporizing unit to the upstream side of the exhaust gas purifying catalyst in the exhaust passage through the exhaust gas re-circulation device without burning the vaporized fuel, whereby the vaporized fuel being supplied to the upstream side of the exhaust gas purifying catalyst in the exhaust passage by way of the exhaust gas re-circulation device.

In the internal combustion engine of the present invention, it is also possible to adopt a construction in which the vaporized fuel supply unit selectively supplies the fuel vaporized by the fuel vaporizing unit to a position on the upstream side of the exhaust gas purifying catalyst in the exhaust passage of the internal combustion engine or to the intake passage of the internal combustion engine.

In this case, during the period until complete explosion occurs in the internal combustion engine or during the period in which the internal combustion engine is performing warm-up operation, the fuel vaporized by the fuel vaporizing unit is supplied to the intake passage of the internal combustion engine; when it is necessary to supply reducing agent to the exhaust gas purifying catalyst, the fuel vaporized by the fuel vaporizing unit is supplied to the exhaust passage.

Further, the vaporized fuel supply unit may be constructed such that the fuel vaporized by the fuel vaporizing unit is supplied simultaneously to a position on the upstream side of the exhaust gas purifying catalysts in the exhaust passage of the internal combustion engine and to the intake passage of the internal combustion engine.

In this case, at least during the period from the start of the internal combustion engine to the completion of warming-up, the fuel vaporized by the fuel vaporizing unit is supplied to the intake passage and the exhaust passage of the internal combustion engine.

In the internal combustion engine of the present invention, vaporized fuel in the unburned state is supplied to the internal combustion engine, so that it is possible to prevent a reduction in the amount of oxygen taken in the internal combustion engine and an increase in the amount of carbon dioxide. Further, the vaporized fuel supplied to the internal combustion engine consists of a light fuel subject to evaporation and ignition, so that it does not easily adhere to the wall surface, etc. of the intake passage, making it possible to generate a relatively large amount of mixture of high inflammability in the combustion chamber of the internal combustion engine. Further, when such light vaporized fuel is compressed in a cylinder in the compression stroke, the vaporized fuel is partly oxidized, making it possible to produce free radicals.

Thus, in the internal combustion engine of the present invention, it is possible to generate a relatively large amount of mixture of very high inflammability in the combustion chamber of the internal combustion engine, whereby it is possible to improve the startability and combustion stability of the internal combustion engine.

Further, in the internal combustion engine of the present invention, the vaporized fuel is supplied to an exhaust gas purifying catalyst, so that it is possible for the exhaust gas purifying catalyst to utilize all the vaporized fuel as reducing agent. In this case, fuel is vaporized in the amount just required as reducing agent. As a result, it is possible to prevent an unnecessary increase in fuel consumption.

DESCRIPTION OF THE PREFERRED EMBODIMENTS

Specific embodiments of the internal combustion engine of the present invention will now be described with reference to the accompanying drawings.

Figure 1:
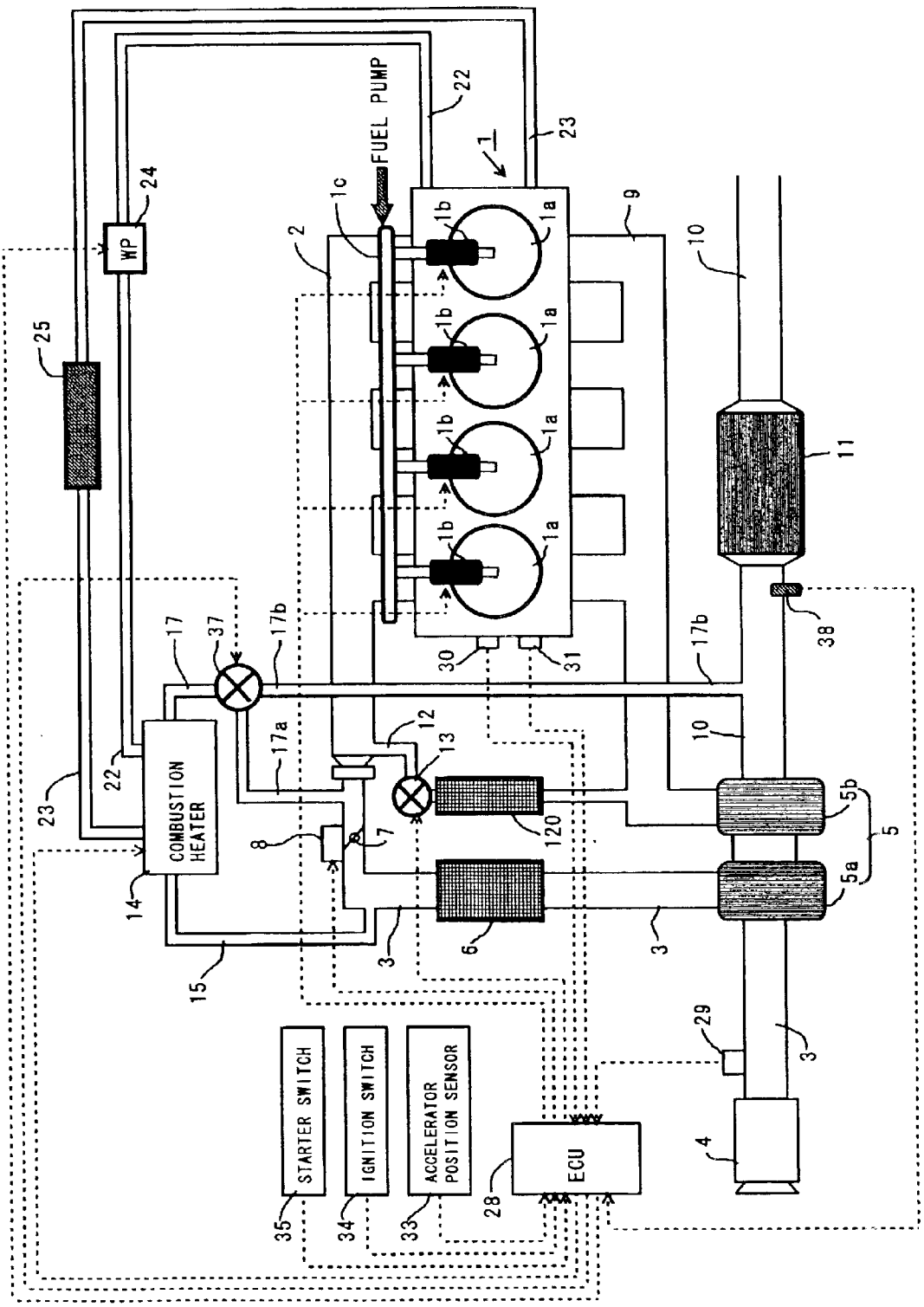
FIG. 1 is a diagram schematically showing the construction of an internal combustion engine to which the present invention is applied.

FIG. 1 is a diagram schematically showing the construction of an internal combustion engine to which the present invention is applied.

An internal combustion engine 1 is a water cooled cylinder-injection type diesel engine equipped with four cylinders 1a. Mounted to this internal combustion engine 1 are a crank position sensor 30 adapted to output a pulse signal each time a crankshaft (not shown) rotates by a predetermined angle, and a water temperature sensor 31 adapted to output an electric signal corresponding to the cooling water temperature water flowing through a water jacket (not shown).

Each cylinder 1a of the internal combustion engine 1 is equipped with a fuel injection valve 1b such that its nozzle hole faces a combustion chamber. Each fuel injection valve 1b communicates with an accumulator chamber (common rail chamber) 1c which stores fuel supplied from a fuel pump (not shown) until a predetermined pressure is reached.

In this fuel injection system, fuel discharged from the fuel pump is accumulated in the accumulator chamber until a predetermined pressure is reached. The fuel accumulated in the accumulator chamber 1c to a predetermined pressure is injected into the combustion chamber of each cylinder 1a when voltage is applied to the fuel injection valve 1b of each cylinder 1a to open it.

Connected to the internal combustion engine 1 is an intake manifold 2, the branches of which communicate with the combustion chambers of the cylinders 1a through intake ports (not shown). The intake manifold 2 is connected to an intake pipe 3, which is connected to an air cleaner box 4 containing an air filter.

At a position of the intake pipe 3 directly on the downstream side of the air cleaner box 4, there is mounted an air flow meter 29 adapted to output an electric signal corresponding to the mass of the intake air flowing through the intake pipe 3.

At a position of the intake pipe 3 on the downstream side of the air flow meter 29, there is provided a compressor housing 5a of a centrifugal turbocharger 5. In the compressor housing 5a, a compressor wheel (not shown) is rotatably supported. The rotation shaft of this compressor wheel is connected to the rotation shaft of a turbine wheel rotatably supported in a turbine housing 5b described below, and the compressor wheel and the turbine wheel rotate integrally.

Next, at a position of the intake pipe 3 on the downstream side of the compressor housing 5a, there is provided an intercooler 6 for cooling the intake air, which has attained high temperature when compressed in the compressor housing 5a. At a position of the intake pipe 3 on the downstream side of the intercooler 6, there is provided an intake throttle valve 7 for adjusting the intake flow rate in the intake pipe 3, and this intake throttle valve 7 is equipped with an intake throttle actuator 8 for opening and closing the intake throttle valve 7.

In the intake system constructed as described above, fresh air flowing into the air cleaner 4 is rid of dust by the air filter, and is then guided to the compressor housing 5a by way of the intake pipe 3 to be compressed in the compressor housing 5a. The fresh air, which has been compressed in the compressor housing 5a to attain high temperature, is cooled by the intercooler 6. The intake air cooled by the intercooler 6 undergoes flow rate adjustment by the intake throttle valve 7 as needed, and is then distributed to the combustion chambers of the cylinders 1a byway of the intake manifold 2. The intake air distributed to the combustion chambers of the cylinders 1a is burned with the fuel injected through the fuel injection valves 1b.

Further, connected to the internal combustion engine 1 is an exhaust manifold 9, the branches of which communicate with the combustion chambers of the cylinders 1a through exhaust ports (not shown). The exhaust manifold 9 is connected to an exhaust pipe 10 through the turbine housing 5b of the centrifugal turbocharger 5, and the exhaust pipe 10 is connected to a muffler (not shown) on the downstream side.

Rotatably provided in the turbine housing 5b is a turbine wheel connected to the above-described compressor wheel, and the turbine wheel rotates by utilizing the heat energy of the exhaust gas.

At some point of the exhaust pipe 10, there is arranged an exhaust gas purifying catalyst 11 for removing the harmful gas components of the exhaust gas. When the bed temperature of the exhaust gas purifying catalyst 11 is equal to or higher than a predetermined temperature, the exhaust gas purifying catalyst 11 is activated, making it possible to remove the harmful gas components from the exhaust gas.

Examples of the exhaust gas purifying catalyst 11 include an oxidation catalyst, selective reduction type lean NOx catalyst, occlusion reduction type lean NOx catalyst, diesel particulate filter (DPF), and diesel particulate NOx reduction (DPNR) catalyst.

At a position of the exhaust pipe 10 directly on the upstream side of the exhaust gas purifying catalyst 11, there is provided an air-fuel ratio sensor 38 adapted to output an electric signal corresponding to the air-fuel ratio of the exhaust gas flowing through the exhaust pipe 10.

In the exhaust system constructed as described above, the mixture (burned gas) burned in the combustion chambers of the cylinders 1a is discharged to the exhaust manifold 9 through the exhaust ports, and then flows from the exhaust manifold 9 into the turbine housing 5b of the centrifugal turbocharger 5. The exhaust gas flowing into the turbine housing 5b rotates the turbine wheel by utilizing the heat energy of the exhaust gas. In this process, the rotation torque of the turbine wheel is transmitted to the compressor wheel of the compressor housing 5a.

The exhaust gas discharged from the turbine housing 5b flows into the exhaust gas purifying catalyst 11 through the exhaust pipe 10. In this process, if the bed temperature of the exhaust gas purifying catalyst 11 is within a temperature purification window, the harmful gas components in the exhaust gas are removed or purified by the exhaust gas purifying catalyst 11. The exhaust gas from which the harmful gas components have been removed or purified by the exhaust gas purifying catalyst 11 is discharged into the atmosphere through the muffler.

The exhaust manifold 9 and the intake manifold 2 communicate with each other through an EGR (exhaust gas re-circulation) passage 12 for causing a part of the exhaust gas flowing through the exhaust manifold 9 to flow back to the intake manifold 2. At points of the EGR passage 12, there are provided an EGR valve 13 comprised of an electromagnetic valve or the like and adapted to change the flow rate of the exhaust gas flowing through the EGR passage 12 (hereinafter referred to as the EGR gas) according to the magnitude of voltage applied, and an EGR cooler 120 for cooling the EGR gas flowing through the EGR passage 12.

In the exhaust gas re-circulation mechanism constructed as described above, when the EGR valve 13 is opened, the EGR passage 12 becomes in a conducting state, and a part of the exhaust gas flowing through the exhaust manifold 9 flows into the EGR passage 12 as the EGR gas. The EGR gas flowing into the EGR passage 12 is guided to the intake manifold 2 by way of the EGR cooler 120.

In the EGR cooler 120, heat exchange is effected between the EGR gas flowing through the EGR passage 12 and a predetermined coolant to thereby cool the EGR gas.

The EGR gas caused to flow back from the exhaust manifold 9 to the intake manifold 2 through the EGR passage 12 is mixed with fresh air coming from the upstream side of the intake manifold 2 and, while being thus mixed, guided to the combustion chambers of the cylinders to be burned by using the fuel injected from the fuel injection valves 1b as the ignition source.

The EGR gas contains inert gas components such as water ($H_2O$) and carbon dioxide ($CO_2$), which do not burn themselves and which have endothermic property, so that when the mixture contains EGR gas, the combustion temperature of the mixture is lowered to thereby restrain the generation of nitrogen oxide (NOx).

Further, when the EGR gas is cooled by the EGR cooler 120, the temperature of the EGR gas itself is lowered and, at the same time, the volume of the EGR gas is reduced, so that there is no unnecessary rise in the atmosphere temperature in the combustion chambers when the EGR gas is supplied to the combustion chambers, and there is no unnecessary reduction in the amount of air (volume of air) supplied to the combustion chambers.

Figure 2:
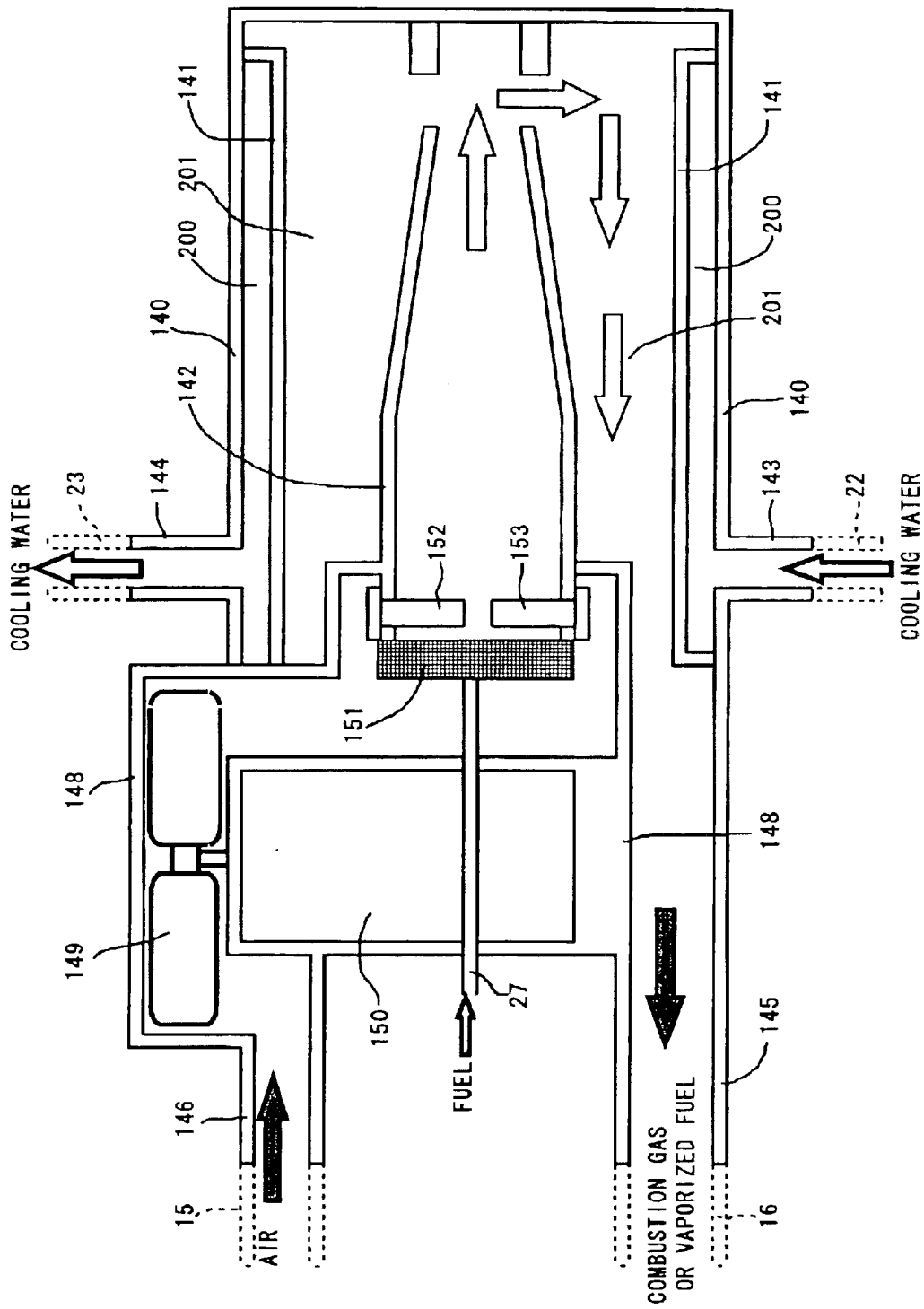
FIG. 2 is a diagram showing the inner construction of a combustion heater.

Besides the internal combustion engine 1, there is provided a combustion heater 14. As shown in FIG. 2, the combustion chamber 14 includes an outer cylinder 140, an intermediate cylinder 141 provided inside the outer cylinder 140, and a combustion cylinder 142 provided inside the intermediate cylinder 141.

Between the outer cylinder 140 and the intermediate cylinder 141, there is formed an in-heater cooling water passage 200 through which the cooling water of the internal combustion engine 1 is to flow. Formed in the outer cylinder 140 are a cooling water introducing port 143 for introducing cooling water into the in-heater cooling water passage 200 and a cooling water discharging port 144 for discharging the cooling water inside the in-heater cooling water passage 200.

A cooling water introducing pipe 22 is connected to the cooling water introducing port 143, and a cooling water discharging pipe 23 is connected to the cooling water discharging port 144. As shown in FIG. 1, the cooling water introducing pipe 22 and the cooling water discharging pipe 23 are connected to a water jacket (not shown) of the internal combustion engine 1. At some point of the cooling water introducing pipe 22, there is provided an electric water pump 24, which forcibly sends the cooling water flowing through the water jacket of the internal combustion engine 1 into the cooling water introducing port 143. At some point of the cooling water discharging pipe 23, there is provided a heater core 25 of a room heating device, which transmits the heat of the cooling water flowing through the cooling water discharging pipe 23 to the room heating air.

At the base portion of the combustion cylinder 142, there is provided a fuel evaporation portion (wick) 151. Connected to the wick 151 is a fuel introducing pipe 27 for guiding a portion of the fuel discharged from the fuel pump for the internal combustion engine 1 to the wick 151. Inside the combustion cylinder 142 and in the vicinity of the wick 151, there are arranged a fuel vaporizing glow plug 152 for vaporizing fuel supplied to the wick 151 from the fuel introducing pipe 27 and a fuel ignition glow plug 153 for igniting the fuel vaporized by the fuel vaporizing glow plug 152.

Mounted to the outer cylinder 140 is a housing 148 containing a blower fan 149 for sending air for combustion to the combustion cylinder 142 and a fan motor 150 for rotating the blower fan 149.

Formed in the housing 148 is an intake port 146 for taking combustion air into the housing 148. As shown in FIG. 1, connected to the intake port 146 is an intake air introducing passage 15, which is connected to the intake pipe 3 at a position between the intercooler 6 and the intake throttle valve 7.

In the peripheral wall of the combustion cylinder 142, there are provided a plurality of through-holes 142a communicating the interior of the combustion cylinder 142 with the interior of the housing 148, whereby the air sent out by the blower fan 149 in the housing 148 can flow into the combustion cylinder 142 through the through-holes 142a.

Of the plurality of through-holes 142a, those which are formed nearer to the base portion of the combustion cylinder 142 mainly function so as to send mixture forming air into the combustion cylinder 142, and those which are formed nearer to the forward end of the combustion cylinder 142 mainly function so as to send the gas inside the combustion cylinder 142 to the exterior of the combustion cylinder 142.

Between the intermediate cylinder 141 and the combustion cylinder 142, there is formed a combustion gas passage 201 through which the combustion gas generated in the combustion cylinder 142 is to flow. At an appropriate position of the intermediate cylinder 141, there is formed a combustion gas discharging port 145 communicating the combustion gas passage 201 with the exterior of the outer cylinder 140.

As shown in FIG. 1, connected to the combustion gas discharging port 145 is a combustion gas discharge passage 17, which is connected to a three-way switching valve 37. In addition to the combustion gas discharge passage 17, an intake-side discharge passage 17a and an exhaust-side discharge passage 17b are connected to the three-way switching valve 37.

The three-way switching valve 37 selectively blocks one of the intake-side discharge passage 17a and the exhaust-side discharge passage 17b, whereby the conduction of the combustion gas discharge passage 17 and the intake-side discharge passage 17a or the conduction of the combustion gas discharge passage 17 and the exhaust-side discharge passage 17b is selectively established. The three-way switching valve 37 is driven by an actuator consisting of a step motor or the like.

The intake-side discharge passage 17a is connected to the intake pipe 3 at a position on the downstream side of the intake throttle valve 7, and the exhaust-side discharge passage 17b is connected to the exhaust pipe 10 at a position between the turbine housing 5b and the exhaust gas purifying catalyst 11.

In the combustion heater 14 constructed as described above, the fan motor 150, the fuel vaporizing glow plug 152, the fuel ignition glow plug 153, and the electric water pump 24 are energized, and a fuel pump (not shown) is operated.

In this case, the fuel pump sucks up fuel in the fuel tank (not shown) and supplies it to the wick 151 of the combustion cylinder 142 and, at the same time, the fan motor 150 operates the blower fan 149 to take a portion of air flowing through the intake pipe 3 into the housing 148 and sends it into the combustion cylinder 142. The air sent out by the blower fan 149 flows into the combustion cylinder 142 through the through-holes 142a.

Subsequently, the fuel supplied to the wick 151 is heated by the fuel vaporizing glow plug 152 to be vaporized, and the vaporized fuel and the air supplied by the blower fan 149 forms a mixture. The mixture is further heated by the fuel ignition glow plug 153 to be ignited.

The combustion gas ignited and burned in the combustion cylinder 142 is pushed out of the combustion cylinder 142 into the combustion gas passage 201 by the pressure of the air sent out by the blower fan 149, and is then discharged from the combustion gas passage 201 to the combustion gas discharge port 145.

The combustion gas discharged to the combustion gas discharge port 145 flows into the combustion gas discharge passage 17 and is guided to the intake pipe 3 or the exhaust pipe 10 by way of the three-way switching valve 37.

The water pump 24 sends the cooling water in the water jacket of the internal combustion engine 1 under pressure to the cooling water introducing port 143 of the combustion heater 14. The cooling water sent to the cooling water introducing port 143 under pressure is guided from the cooling water introducing port 143 to the in-heater cooling water passage 200, and, after passing through the in-heater cooling water passage 200, is discharged to the cooling water discharge port 144.

In the process, the heat of the combustion gas flowing through the combustion gas passage 201 is transmitted through the wall of the intermediate cylinder 141 to the cooling water flowing through the in-heater cooling water passage 200, with the result that the temperature of the cooling water is raised.

The cooling water, whose temperature has been thus raised, is discharged from the cooling water discharge port 144 to the cooling water discharge pipe 23, and returned to the interior of the water jacket of the internal combustion engine 1 by way of the heater core 25 to be circulated through the water jacket. In the heater core 25, a part of the heat of the cooling water is transmitted to the room heating air to thereby raise the temperature of the room heating air.

Referring again to FIG. 1, provided along with the internal combustion engine 1, constructed as described above, is an electronic control unit (ECU) 28. This ECU 28 is a unit which controls the operating state of the internal combustion engine 1 in accordance with the operating condition of the internal combustion engine 1 and the requirement from the operator.

In addition to the air flow meter 29, the crank position sensor 30, the water temperature sensor 31, and the air-fuel ratio sensor 38 mentioned above, various sensors are connected to the ECU 28 through electrical wiring: an accelerator position sensor 33 adapted to output an electric signal corresponding to the operating amount (accelerator opening) of an accelerator pedal (not shown), an ignition switch 34, a starter switch 35, etc., output signals of the various sensors being input to the ECU 28.

Further, connected to the ECU 28 through electrical wiring are the fuel injection valves 1b, the intake throttle actuator 8, the EGR valve 13, the electric water pump 24, the three-way switching valve 37, the fan motor 150, the fuel vaporizing glow plug 152, the fuel ignition glow plug 153, etc., so that the ECU 28 can control the fuel injection valves 1b, the intake throttle actuator 8, the EGR valve 13, the electric water pump 24, the three-way switching valve 37, the fan motor 150, the fuel vaporizing glow plug 152, and the fuel ignition glow plug 153 by using the output signal values of the various sensors as parameters.

Figure 3:
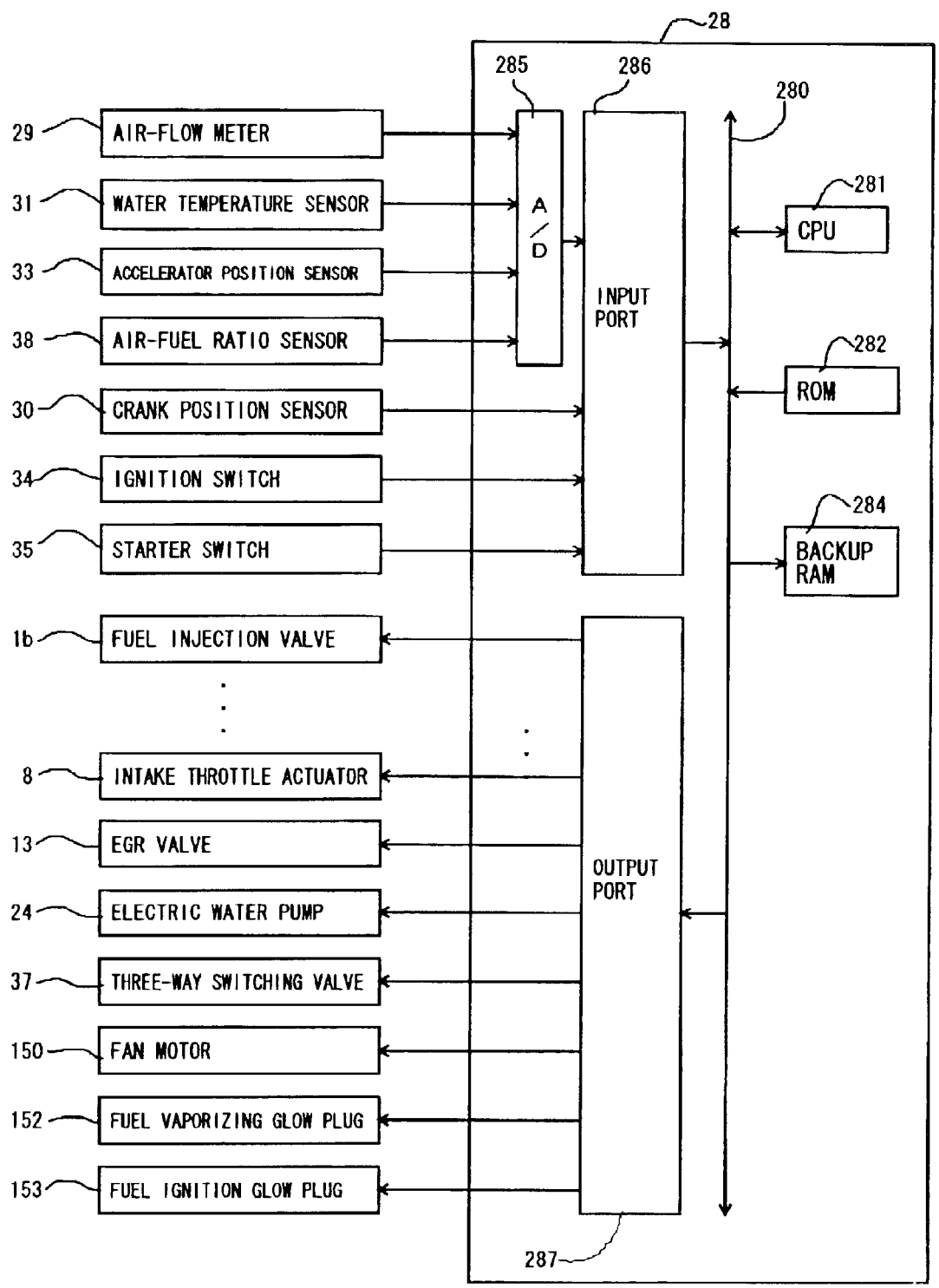
FIG. 3 is a block diagram showing the inner construction of an ECU.

As shown in FIG. 3, the ECU 28 is equipped with a CPU 281, a ROM 282, a RAM 283, a back-up RAM 284, an input port 286, and an output port 287 mutually connected to each other by a two-way bus 280, and is equipped with an A/D converter (A/D) 285 connected to the input port 286.

The input port 286 inputs output signals of the sensors outputting digital signals, such as the crank position sensor 30, the ignition switch 34, and the starter switch 35, and transmits the output signals to the CPU 281, the RAM 283, etc.

The input port 286 inputs output signals of the A/D 285 outputting analog signals, such as the air flow meter 29, the water temperature sensor 31, the accelerator position sensor 33 and the air-fuel ratio sensor 38, and transmits the output signals to the CPU 281, the RAM 283, etc.

The output port 287 is connected to the fuel injection valves 1b, the intake throttle actuator 8, the EGR valve 13, the electric water pump 24, the three-way switching valve 37, the fan motor 150, the fuel vaporizing glow plug 152, the fuel ignition glow plug 153, etc., through an electronic wiring, and the control signal output from CPU 281 is sent to the fuel injection valves 1b, the intake throttle actuator 8, the EGR valve 13, the electric water pump 24, the three-way switching valve 37, the fan motor 150, the fuel vaporizing glow plug 152 or the fuel ignition glow plug 153.

The ROM 282 stores various application programs, such as a fuel injection valve control routine for controlling the fuel injection valves 1b, an intake throttle control routine for controlling the intake throttle valve 7, an EGR control routine for controlling the EGR valve 13, and a heater control routine for collectively controlling the combustion heater 14, the three-way switching valve 37, and the electric water pump 24 and, further, a start-time heater control routine for collectively controlling the combustion heater 14 and the three-way switching valve 37 at the start of the internal combustion engine 1, a heater control routine during warm-up operation for collectively controlling the combustion heater 14 and the three-way switching valve 37 during warm-up operation of the internal combustion engine 1, and a heater control routine for supplying reducing agent for collectively controlling the combustion heater 14 and the three-way switching valve 37 when supplying reducing agent to the exhaust gas purifying catalyst 11.

In addition to the above-mentioned application programs, the ROM 282 stores various control maps. The control maps, consist, for example, of a fuel injection amount control map indicating the relationship between the operating state of the internal combustion engine 1 and the basic fuel injection amount (basic fuel injection time), a fuel injection timing control map indicating the relationship between the operating state of the internal combustion engine 1 and the basic fuel injection time, an intake throttle valve opening control map indicating the relationship between the operating state of the internal combustion engine 1 and the target opening of the intake throttle valve 7, an EGR gas amount control map indicating the relationship between the operating state of the internal combustion engine 1 and the target EGR gas amount, an EGR valve opening control map indicating the relationship between the target EGR gas amount and the target opening of the EGR valve 13, and a heater control map indicating the relationship between the operating state of the internal combustion engine 1 and the combustion heater 14.

The RAM 283 stores output signals from the sensors, the computation result of the CPU 281, etc. The computation result consists, for example, of an engine revolution speed calculated on the basis of the time interval at which the crank position sensor 30 outputs pulse signals. Such data is updated each time the crank position sensor 30 outputs a pulse signal.

The back-up RAM 284 is a nonvolatile memory capable of storing data even after the operation of the internal combustion engine 1 is stopped.

The CPU 281 operates in accordance with the application programs stored in the ROM 282 to execute fuel injection valve control, intake throttle control, EGR control, and combustion heater control, and in addition, start-time heater control, heater control during warm-up operation, and heater control for supplying reducing agent, which constitute the gist of the present invention are executed.

In the following, heater control at the engine start, heater control during warm-up operation, and heater control at the time of reducing agent supply will be described.

Figure 4:
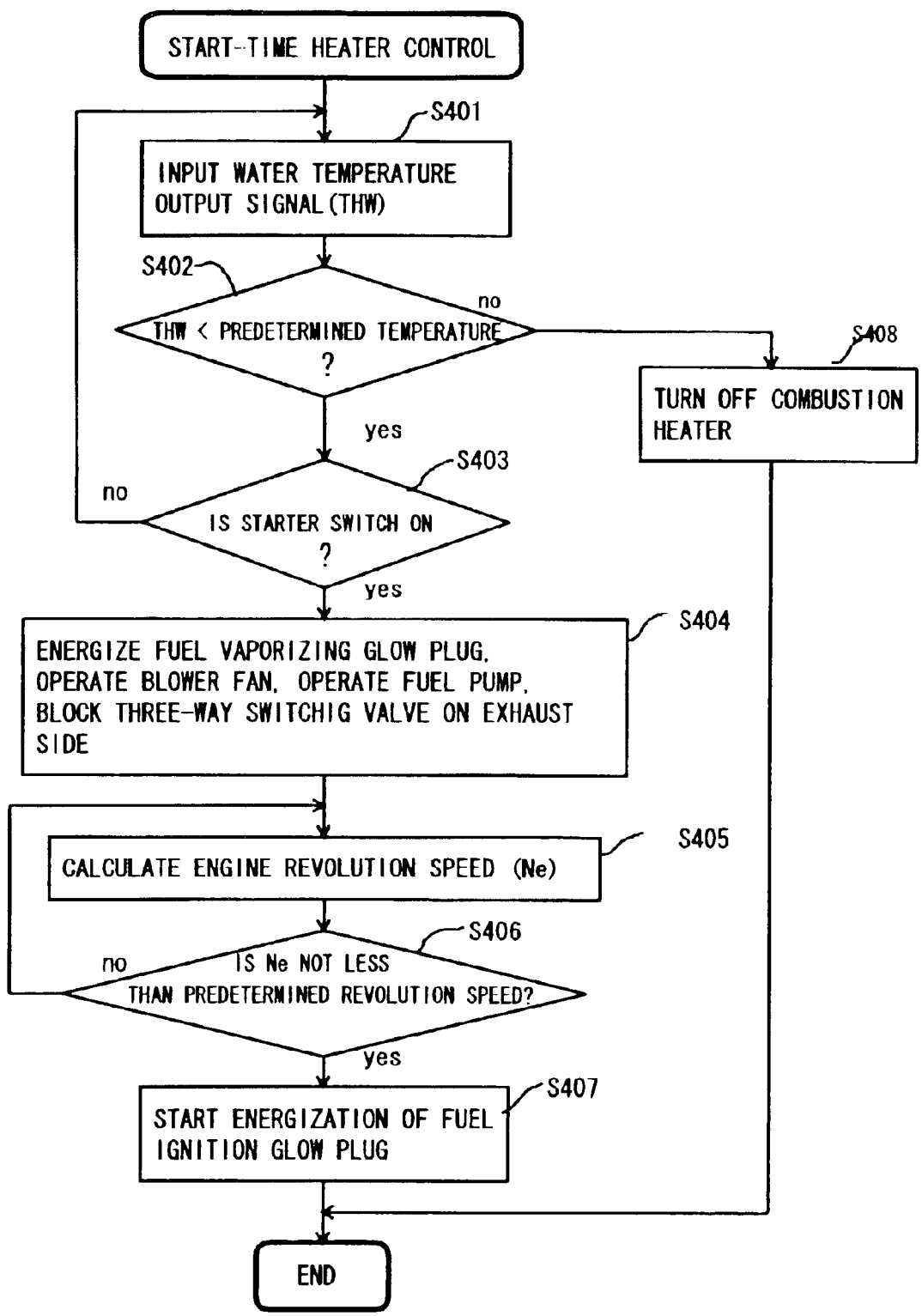
FIG. 4 is a flowchart showing a heater control routine for engine start.

First, in executing heater control at the engine start, the CPU 281 executes the start-time heater control routine as shown in FIG. 4. This start-time heater control routine is a routine which is previously stored in the ROM 282 and which is executed by the CPU 281 by using the switching ON of the ignition switch as a trigger.

In the start-time control routine, the CPU 281 first inputs, in S401, the output signal value of the water temperature sensor 31 (cooling water temperature), which is defined as THW.

In S402, CPU 281 makes a judgment as to whether the cooling water temperature (THW) input in S401 is lower than a predetermined temperature (e.g., the water temperature after the completion of the warming-up of the internal combustion engine 1).

When it is determined in S402 that the cooling water temperature (THW) is equal to or higher than the predetermined temperature, the CPU 281 considers the internal combustion engine 1 not to be in the cold state, and the procedure advances to S408. In S408, the CPU 281 puts the combustion heater 14 into the stop state of the operation, terminating the execution of this routine.

When it is determined in S402 that the cooling water temperature (THW) is lower than the predetermined temperature, the CPU 281 considers the internal combustion engine 1 to be in the cold state, and the procedure advances to S403. In S403, a judgment is made as to whether the starter switch 35 is switched from OFF to ON or not.

When it is determined in S403 that the starter switch 35 is not switched from OFF to ON, the CPU 281 again executes the operations of from S401 onward.

When it is determined in S403 that the starter switch 35 is switched from OFF to ON, that is, when the cranking of the internal combustion engine 1 is started, the procedure for the CPU 281 advances to S404, where driving voltage is applied to the fan motor 150 of the combustion heater 14, the fuel vaporizing glow plug 152, and the fuel pump, and the three-way switching valve 37 is controlled so as to block the exhaust-side discharge passage 17b.

In this case, fuel discharged from the fuel pump is supplied through the fuel introducing pipe 27 to the wick 151 of the combustion heater 14, and the fan motor 150 operates the blower fan 149 to supply a portion of air flowing through the intake pipe 3 to the combustion cylinder 142 of the combustion heater 14.

Subsequently, the fuel supplied to the wick 151 is heated by the fuel vaporizing glow plug 152 to be vaporized. The fuel vaporized in the combustion cylinder 142 is pushed out of the combustion cylinder 142 into the combustion gas passage 201 together with the air sent out by the blower fan 149, and then discharged from the combustion gas passage 201 to the combustion gas discharge port 145. The vaporized fuel and air (hereinafter referred to as the vaporized fuel gas) discharged to the combustion gas discharge port 145 is guided to the intake pipe 3 through the combustion gas discharge passage 17, the three-way switching valve 37, and the intake-side discharge passage 17a.

The vaporized fuel gas guided to the intake pipe 3 is mixed with the air coming from the upstream side of the intake pipe 3, and while being thus mixed with the air, reaches the intake manifold 2; then it is distributed from the intake manifold 2 to the combustion chamber of each cylinder 1a.

The fuel vaporized in the combustion heater 14 becomes light fuel subject to evaporation and easy to vaporize, so that it is mixed with air without adhering to the wall surface of the intake passage, etc., forming a highly inflammable mixture.

The mixture of the vaporized fuel gas and air distributed to the combustion chamber of each cylinder 1a is compressed in the compression stroke to undergo temperature rise, and in the temperature rise process, the vaporized fuel is partly oxidized, accompanied by a cool flame reaction, producing highly reactive free radicals.

Thus, when fuel is injected from each fuel injection valve 1b near the top dead center in the subsequent compression stroke, the combustion of the fuel (oxidation reaction) is promoted by the free radicals, with the result that the fuel burns more easily in each cylinder 1a, thereby improving the startability of the internal combustion engine.

Referring again to the flowchart of FIG. 4, after the execution of the processing of S404, the procedure for the CPU 281 advances to S405, where the engine revolution speed (Ne) of the internal combustion engine 1 is calculated on the basis of the time interval at which the crank position sensor 30 outputs pulse signals.

In S406, the CPU 281 makes a judgment as to whether the engine revolution speed (Ne) calculated in S405 is not less than a predetermined revolution speed (e.g., idling engine speed in normal operation).

When it is determined in S406 that the engine revolution speed (Ne) is less than the predetermined revolution speed, it is assumed that the internal combustion engine has not undergone complete explosion, and the procedures of from S404 onward are executed again.

When it is determined in S406 that the engine revolution speed (Ne) is not less than the predetermined revolution speed, it is determined that the internal combustion engine 1 has undergone complete explosion, and the procedure advances to S407.

In S407, the CPU 281 starts the application of driving voltage to the fuel ignition glow plug 153 of the combustion heater 14.

In this case, in the combustion heater 14, the fuel supplied to the wick 151 is vaporized by the fuel vaporizing glow plug 152, and then ignited for combustion by the fuel ignition glow plug 153. The gas burned in the combustion cylinder 142 receives the pressure of the air sent out by the blower fan 149, and is forced into the combustion gas passage 201 from the combustion cylinder 142; then, it is discharged from the combustion gas passage 201 to the combustion gas discharge port 145. The combustion gas discharged to the combustion gas discharge port 145 is guided to the intake pipe 3 through the combustion gas discharge passage 17, the three-way switching valve 37, and the intake-side discharge passage 17a.

In the process, the intake temperature of the internal combustion engine 1 is raised by the heat of the combustion gas, whereby it is possible to secure atomization of fuel and combustion stability in the internal combustion engine 1.

For early activation of the exhaust gas purifying catalyst 11, the CPU 281 may start in S407 the application of driving voltage to the fuel ignition glow plug 153 and, at the same time, control the three-way switching valve 37 so as to block the intake-side discharge passage 17a. In this case, the combustion gas at relatively high temperature discharged from the combustion heater 14 is supplied to the exhaust gas purifying catalyst 11 by way of the exhaust-side discharge passage 17b and the exhaust pipe 10. As a result, the heat of the combustion gas is transmitted to the exhaust gas purifying catalyst 11, whereby the exhaust gas purifying catalyst 11 quickly undergoes temperature rise.

As described above, when the internal combustion engine 1 is cold-started through execution of the start-time heater control routine by the CPU 281 at the engine start, it is possible to supply unburned vaporized fuel gas from the combustion heater 14 to the internal combustion engine 1 during the period from the cranking start of the internal combustion engine 1 to the generation of complete explosion, so that there is no decrease in the amount of oxygen taken in by the internal combustion engine 1, nor is there any increase in the amount of carbon dioxide. Further, through supply of light vaporized fuel from the combustion heater 14 to the internal combustion engine 1, it becomes easy to create a relatively large amount of inflammable mixture; further, through partial oxidation of the vaporized fuel, accompanied by cool flame reaction, in the cylinders 1a in the compression stroke, it is possible to produce highly reactive free radicals.

As a result, when cold-starting the internal combustion engine 1, it is possible to create in each cylinder 1a a relatively large amount of highly inflammable mixture during the period from the start to the generation of complete explosion, whereby it is possible to improve the startability of the internal combustion engine 1.

In particular, in the case of a compression-ignition type internal combustion engine like the internal combustion engine 1, the mixture does not easily undergo temperature rise and is hard to vaporize when cold-starting the engine; in such a case, the application of the present invention makes it possible to realize a superior startability.

Figure 5:
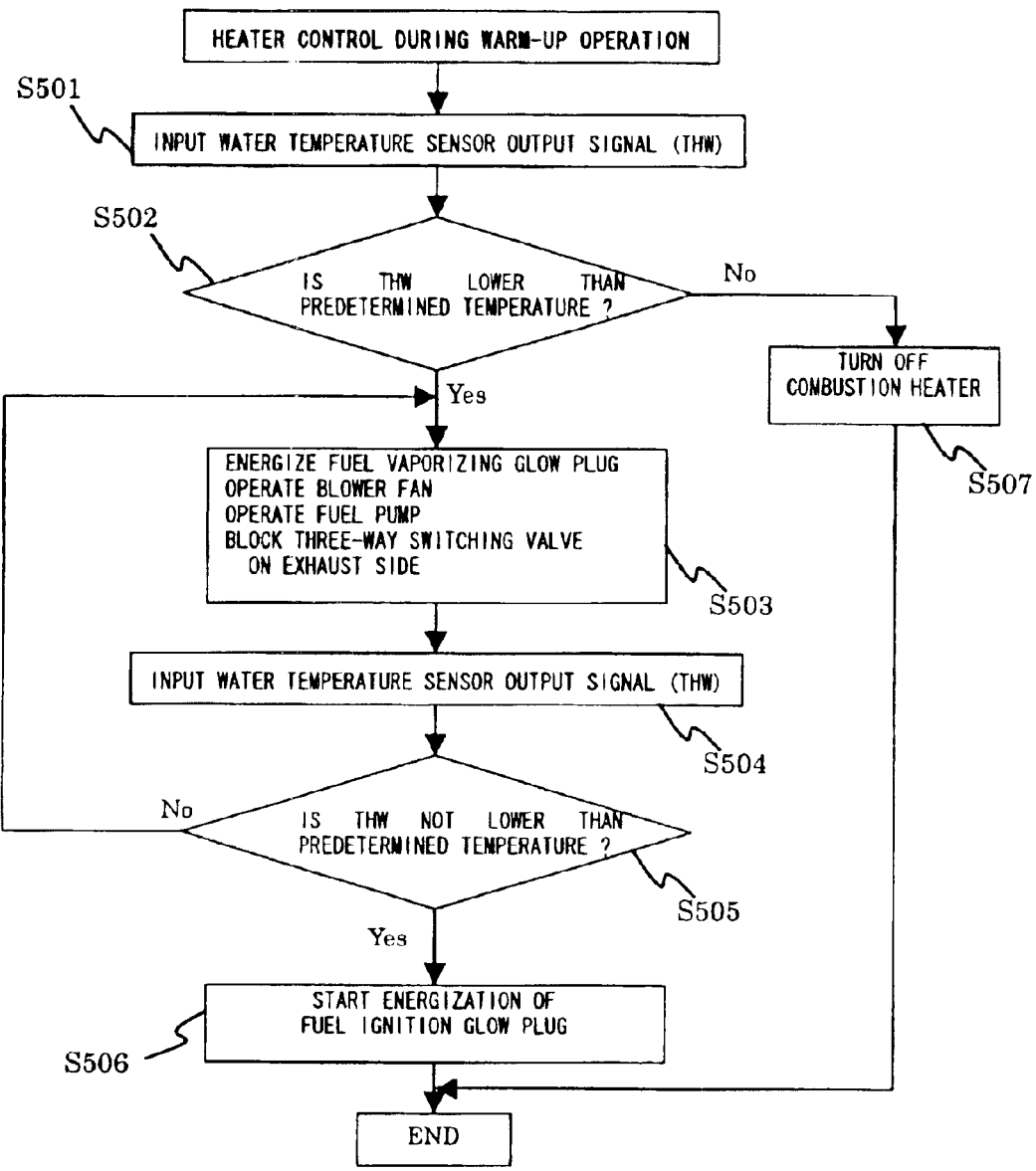
FIG. 5 is a flowchart showing a heater control routine for warm-up operation.

Next, in executing heater control during warm-up operation, the CPU 281 executes a heater control routine during warm-up operation as shown in FIG. 5. The heater control routine during warm-up operation is a routine which is previously stored in the ROM 282 and which is repeatedly executed by the CPU 281 for each predetermined time (e.g., each time the crank position sensor 30 outputs a pulse signal).

In the heater control routine during warm-up operation, the CPU 281 first inputs, in S501, the output signal value of the water temperature sensor 31 (cooling water temperature), which is defined as THW.

In S502, the CPU 281 makes a judgment as to whether the cooling water temperature (THW) input in S501 is lower than a predetermined temperature (e.g., the water temperature after the completion of the warming-up of the internal combustion engine 1).

When it is determined in S502 that the cooling water temperature (THW) is equal to or higher than the predetermined temperature, the CPU 281 considers the operating condition of the internal combustion engine 1 not to be in the warm-up operation region, and the procedure advances to S507. In S507, the CPU 281 puts the combustion heater 14 into the stop state of the operation, and the execution of the routine is terminated.

When it is determined in S502 that the cooling water temperature (THW) is lower than the predetermined temperature, the CPU 281 considers the operating condition of the internal combustion engine 1 to be in the warm-up operation region, and the procedure advances to S503.

In S503, the CPU 281 applies driving voltage to the fan motor 150 of the combustion heater 14, the fuel vaporizing glow plug 152, and the fuel pump, and, at the same time, controls the three-way switching valve 37 so as to block the exhaust-side discharge passage 17b.

In this case, fuel discharged from the fuel pump is supplied through the fuel introducing pipe 27 to the wick 151 of the combustion heater 14, and the fan motor 150 operates the blower fan 149 to supply a portion of air flowing through the intake pipe 3 to the combustion cylinder 142 of the combustion heater 14.

Subsequently, the fuel supplied to the wick 151 is heated by the fuel vaporizing glow plug 152 to be vaporized. The fuel vaporized in the combustion cylinder 142 is pushed out of the combustion cylinder 142 into the combustion gas passage 201 together with the air sent out by the blower fan 149, and then discharged from the combustion gas passage 201 to the combustion gas discharge port 145. The vaporized fuel and air (hereinafter generically referred to as the vaporized fuel gas) discharged to the combustion gas discharge port 145 is guided to the intake pipe 3 through the combustion gas discharge passage 17, the three-way switching valve 37, and the intake-side discharge passage 17a.

The vaporized fuel gas guided to the intake pipe 3 is mixed with the air coming from the upstream side of the intake pipe 3, and while being thus mixed with the air, reaches the intake manifold 2; then it is distributed from the intake manifold 2 to the combustion chamber of each cylinder 1a.

The fuel vaporized in the combustion heater 14 becomes light fuel subject to evaporation and easy to vaporize, so that it is mixed with air without adhering to the wall surface of the intake passage, etc., forming a highly inflammable mixture.

The mixture of the vaporized fuel gas and air distributed to the combustion chamber of each cylinder 1a is compressed in the compression stroke to undergo temperature rise, and in the temperature rise process, the vaporized fuel is partly oxidized, accompanied by a cool flame reaction, producing highly reactive free radicals.

Thus, when fuel is injected from each fuel injection valve 1b near the top dead center in the subsequent compression stroke, the combustion of the fuel (oxidation reaction) is promoted by the free radicals, with the result that the fuel burns more easily in each cylinder 1a, thereby stabilizing the combustion of the internal combustion engine 1.

Referring again to the flowchart of FIG. 5, after the execution of the processing of S503, the procedure for the CPU 281 advances to S504, where the output signal value of the sensor of the water sensor 31 (THW) is again input.

In S505, the CPU 281 makes a judgment as to whether the cooling water temperature (THW) input in S504 is higher than a predetermined temperature.

When it is determined in S505 that the cooling water temperature (THW) is lower than the predetermined temperature, CPU 281 considers the operating condition of the internal combustion engine 1 is to be still performing warm-up operation, and the procedures of from S503 onward are executed again.

When it is determined in S505 that the cooling water temperature (THW) is equal to or higher than the predetermined temperature, CPU 281 considers the operating condition of the internal combustion engine 1 to have completed warming-up, and the procedure advances to S506.

In S506, the CPU 281 starts the application of driving voltage to the fuel ignition glow plug 153 of the combustion heater 14.

As described above, through execution of the warm-up operation heater control routine by the CPU 281, it is possible to supply unburned vaporized fuel gas from the combustion heater 14 to the internal combustion engine 1 under conditions where the combustion in the internal combustion engine 1 is likely to become unstable, so that there is no decrease in the amount of oxygen taken in by the internal combustion engine 1, nor is there any increase in the amount of carbon dioxide. Further, since light vaporized fuel is supplied from the combustion heater 14 to the internal combustion engine 1, a relatively large amount of inflammable mixture is easily created; further, through partial oxidation of the vaporized fuel, accompanied by cool flame reaction, in the cylinders 1a in the compression stroke, it is possible to produce highly reactive free radicals.

As a result, when the internal combustion engine is performing warm-up operation, it is possible to create in each cylinder 1a a relatively large amount of highly inflammable mixture, thus making it possible to stabilize the combustion in the internal combustion engine 1.

Figure 6:
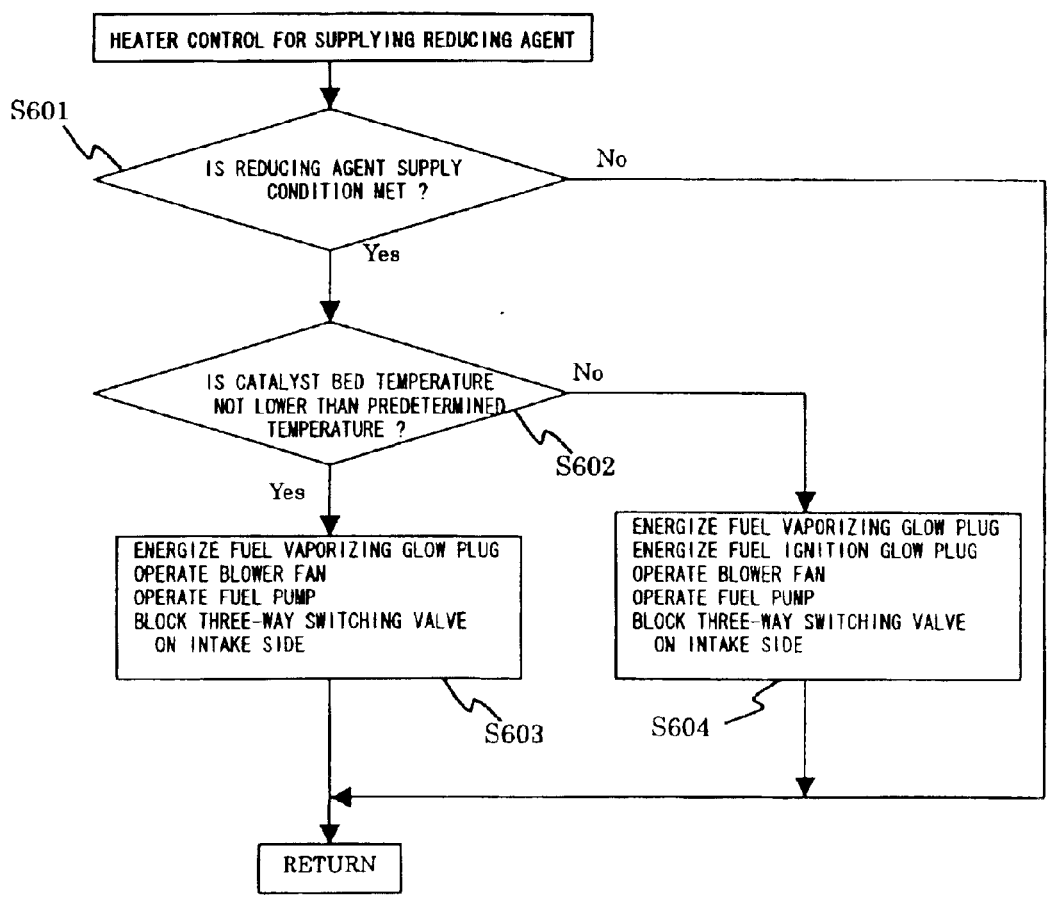
FIG. 6 is a flowchart showing a control routine for reducing agent supply.

Further, in executing the heater control at the time of reducing agent supply, the CPU 281 executes the heater control routine for supplying reducing agent as shown in FIG. 6. This is a routine which is previously stored in the ROM 282 and which is repeatedly executed by the CPU 281 for each predetermined time (e.g., each time the crank position sensor 30 outputs a pulse signal).

In the heater control routine for supplying reducing agent, the CPU 281 first makes a judgment in S601 as to whether the condition for supplying reducing agent is met or not. For example, this condition for supplying reducing agent may be that the NOx occlusion amount in which case the exhaust gas purifying catalyst 11 is an occlusion-reduction type catalyst is not less than a predetermined amount, or that the degree of sulfur poisoning of the exhaust gas purifying catalyst 11 has reached the upper limit.

When it is determined in S601 that such condition for supplying reducing agent is not met, the CPU 281 temporarily terminates the execution of this routine.

When it is determined in S601 that the condition for supplying reducing agent is met, the procedure for the CPU 281 advances to S602, where a judgment is made as to whether the bed temperature of the exhaust gas purifying catalyst 11 is equal to or higher than a predetermined temperature. For example, when the NOx catalyst occluded in the exhaust gas purifying catalyst 11 is to be reduced or purified, the predetermined temperature can be set at the activation temperature of the exhaust gas purifying catalyst 11; when the exhaust gas purifying catalyst 11 is to be recovered from sulfur poisoning, it can be set at a temperature which allows thermal decomposition and reduction of sulfur oxide.

When it is determined in S602 that the bed temperature of the exhaust gas purifying catalyst 11 is lower than the predetermined temperature, the procedure for the CPU 281 advances to S604, where a catalyst temperature rising processing is executed. Specifically, the CPU 281 applies driving voltage to the fuel vaporizing glow plug 152, the fuel ignition glow plug 153, the fan motor 150, and the fuel pump, and, at the same time, controls the three-way switching valve 37 so as to block the intake-side discharge passage 17a.

In this case, the fuel is burned in the combustion heater 14, and the resultant combustion gas is supplied to the exhaust gas purifying catalyst 11 by way of the combustion gas discharge port 145, the combustion gas discharge passage 17, the three-way switching valve 37, the exhaust-side discharge passage 17b, and the exhaust pipe 10. As a result, the heat of the combustion gas is transmitted to the exhaust gas purifying catalyst 11, and the temperature of the exhaust gas purifying catalyst 11 is raised quickly.

After executing the above-described catalyst temperature raising processing, the CPU 281 temporarily terminates the execution of this routine.

When it is determined in S602 that the bed temperature of the exhaust gas purifying catalyst 11 is equal to or higher than the predetermined temperature, the procedure for the CPU 281 advances to S603, where driving voltage is applied to the fan motor 150 of the combustion heater 14, the fuel vaporizing glow plug 152, and the fuel pump, and, at the same time, the three-way switching valve 37 is controlled so as to block the intake-side discharge passage 17a.

In this case, no fuel is burned in the combustion heater 14, and only the vaporization of fuel is effected. And, the fuel vaporized in the combustion heater 14 is pushed out of the combustion cylinder 142 into the combustion gas passage 201 together with the air sent out by the blower fan 149, and is then discharged from the combustion gas passage 201 to the combustion gas discharge port 145. The vaporized fuel and air (vaporized fuel gas) discharged to the combustion gas discharge port 145 is guided to the exhaust pipe 10 by way of the combustion gas discharge passage 17, the three-way switching valve 37, and the exhaust-side discharge passage 17b.

The vaporized fuel gas guided to the exhaust pipe 10 flows into the exhaust gas purifying catalyst 11 together with the exhaust gas flowing from the upstream side of the exhaust pipe 10. The vaporized fuel flowing into the exhaust gas purifying catalyst 11 acts as a reducing agent for NOx or a reducing agent for sulfur oxide.

In this way, the CPU 281 executes the heater control routine for supplying reducing agent, whereby, when it is necessary to supply reducing agent to the exhaust gas purifying catalyst 11, it is possible to supply vaporized fuel as reducing agent to the exhaust gas purifying catalyst by vaporizing fuel without burning the fuel in the combustion heater 14.

In this case, since no fuel is burnt in the combustion heater 14, soot or the like is not easily accumulated in the combustion heater 14, and it is possible to prevent consumption of fuel caused by unnecessary combustion.

As a result, it is possible to supply fuel in a desirable manner to the exhaust gas purifying catalyst 11 without deteriorating the performance of the combustion heater 14 or having to newly provide a dedicated reducing agent supply mechanism or the like.

Other Embodiments

Figure 7:
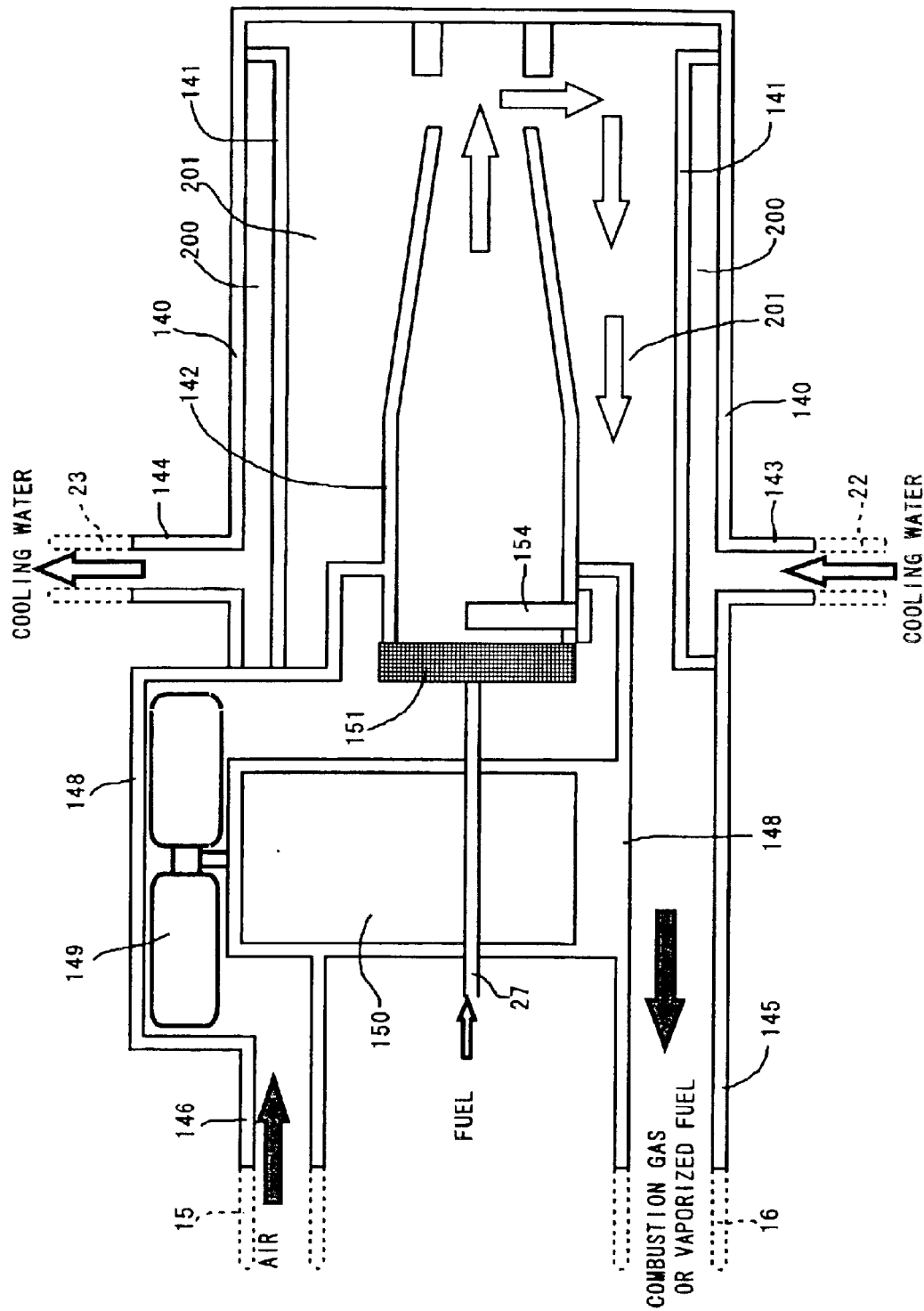
FIG. 7 is a diagram showing another embodiment of the combustion heater.

While in the above-described embodiment the combustion heater 14 is provided with separate glow plugs: the fuel vaporizing glow plug and the fuel ignition glow plug. It is also possible, as shown in FIG. 7, to provide a single glow plug 154, switching between ignition and vaporization of fuel by controlling the magnitude of the voltage applied to the glow plug 154.

In this case, it is possible to achieve the same operation and effect as those of the above-described embodiment, and to simplify the structure related to the combustion heater 14.

Figure 8:
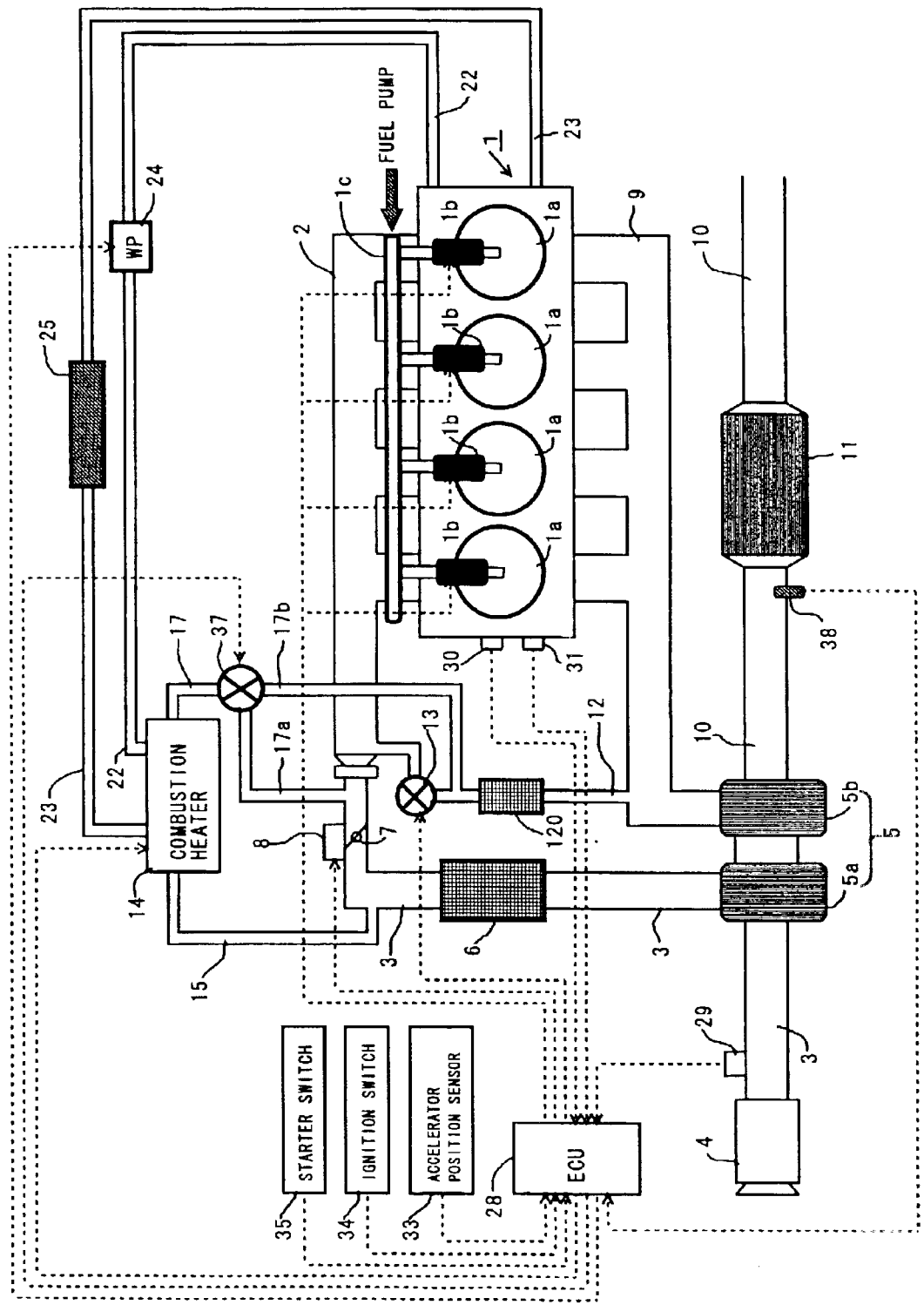
FIG. 8 is a diagram showing another embodiment (1) of an internal combustion engine to which the present invention is applied.

Further, while in the above-described embodiment the exhaust-side discharge passage 17b connects the three-way switching valve 37 to a portion of the exhaust pipe 10 on the upstream side of the exhaust gas purifying catalyst 11, it is also possible, as shown in FIG. 8, to connect the three-way switching valve 37 and the EGR passage 12. That is, it is possible to form a part of the route from the combustion heater 14 to the exhaust pipe 10 by the existing EGR passage 12.

In this case, it is possible to achieve the same operation and effect as those of the above-described embodiment, and to simplify the piping structure related to the combustion heater 14, thereby achieving an improvement in vehicle-mountability.

Figure 9:
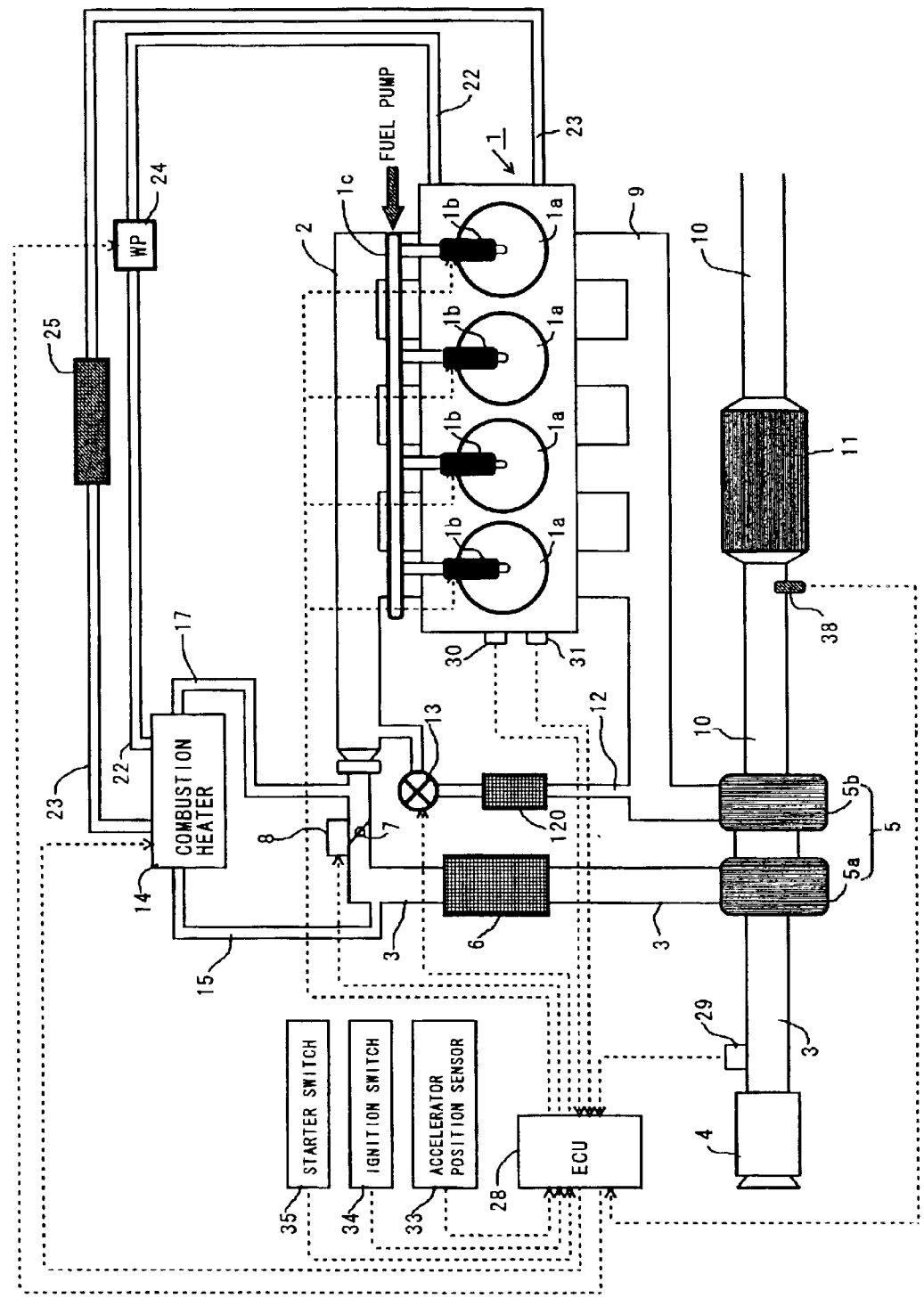
FIG. 9 is a diagram showing another embodiment (2) of an internal combustion engine to which the present invention is applied.

When, as shown in FIG. 9, the combustion heater 14 and the intake pipe 3 are connected by the combustion gas discharge passage 17, and the gas discharged from the combustion heater 14 is supplied to the exhaust system, it is possible to establish, by opening the EGR valve 13, a route from the combustion heater 14 to the exhaust manifold 9 by way of the intake pipe 3, the intake manifold 2, and the EGR passage. In this case, it is possible to further simplify the piping structure related to the combustion heater 14.

Figure 10:
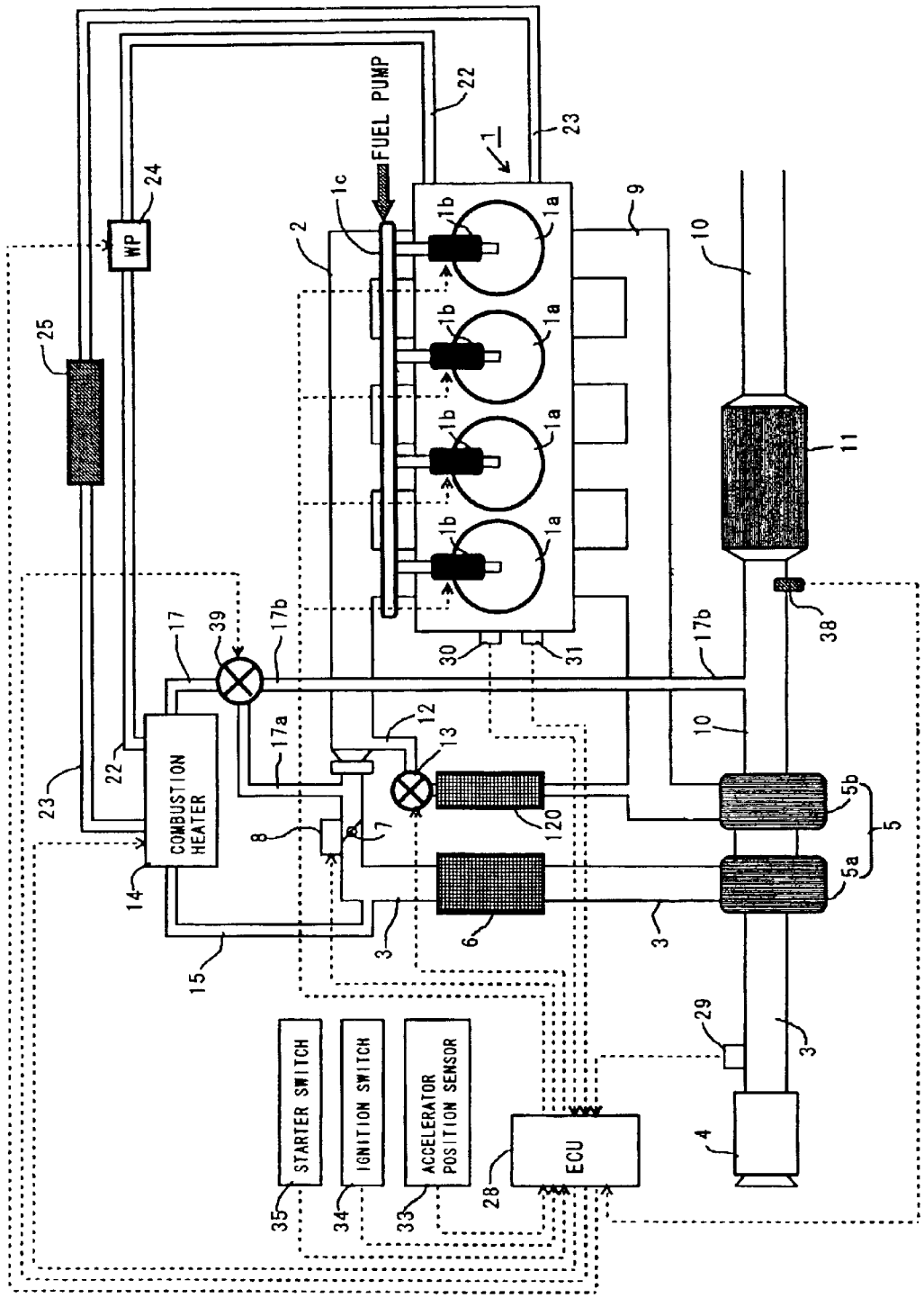
FIG. 10 is a diagram showing another embodiment (3) of an internal combustion engine to which the present invention is applied.

Further, as shown in FIG. 10, by discharging the gas discharged from the combustion heater 14 to both the exhaust system and the intake system, it is possible to improve the startability and combustion stability of the internal combustion engine and to activate the exhaust gas purifying catalyst. The construction of the internal combustion engine shown in FIG. 10 is the same as that shown in FIG. 1 except that the valve for switching the flow of the gas discharged from the combustion heater 14 is a flow rate control valve 39. The components which are the same as those of FIG. 1 are indicated by the same reference numerals and a description of such components will be omitted. The flow rate control valve 39 serves to adjust the proportion of the amount of discharge gas from the combustion heater 14 flowing into the intake-side discharge passage 17a and the exhaust-side discharge passage 17b.

This embodiment provides the following advantages: during the period from the start to the warm-up completion of the internal combustion engine, the atmosphere temperature of the intake port and the combustion chamber of the internal combustion engine is low, so that, by supplying vaporized fuel from the combustion heater 14, the amount of fuel adhering to the intake port wall surface and the combustion chamber wall surface (wall surface adhesion fuel) decreases, and a highly inflammable mixture is created in the combustion chamber, whereby it is possible to reduce the amount of the unburned fuel component in the exhaust gas and to achieve an improvement in combustion stability.

Further, during the period from the start to the warm-up completion of the internal combustion engine, the exhaust gas purifying catalyst is at low temperature like the internal combustion engine and is in an inactive state, whereas the upstream-side end portion of the exhaust gas purifying catalyst is exposed to the high-temperature exhaust gas from the internal combustion engine and is activated at a relatively early stage. When vaporized fuel is supplied from the combustion heater 14, with the upstream-side end portion of the exhaust gas purifying catalyst being thus partially activated, the vaporized fuel is oxidized (burned) at the upstream-side end portion of the exhaust gas purifying catalyst, and, due to the reaction heat generated in the process (combustion heat), the temperature of the exhaust gas purifying catalyst is quickly raised to the activation temperature.

As stated above, when vaporized fuel is supplied to the intake passage of the internal combustion engine simultaneously with the starting of the internal combustion engine, it is possible to reduce the amount of the unburned fuel component in the exhaust gas and to achieve an improvement in combustion stability; on the other hand, when vaporized fuel is supplied to the exhaust gas purifying catalyst simultaneously with the starting of the internal combustion engine, it means that the exhaust gas purifying catalyst is supplied with vaporized fuel in a state in which it has not been activated at all and it is to be expected that the vaporized fuel will be dissipated into the atmosphere without being oxidized by the exhaust gas purifying catalyst. In view of this, it is desirable to supply vaporized fuel from the combustion heater 14 solely to the intake passage during the period from the starting of the internal combustion engine to the partial activation of the exhaust gas purifying catalyst, and to supply vaporized fuel from the combustion heater to the intake passage and the exhaust gas purifying catalyst during the period from the partial activation of the exhaust gas purifying catalyst to the warm-up completion.

Figure 11:
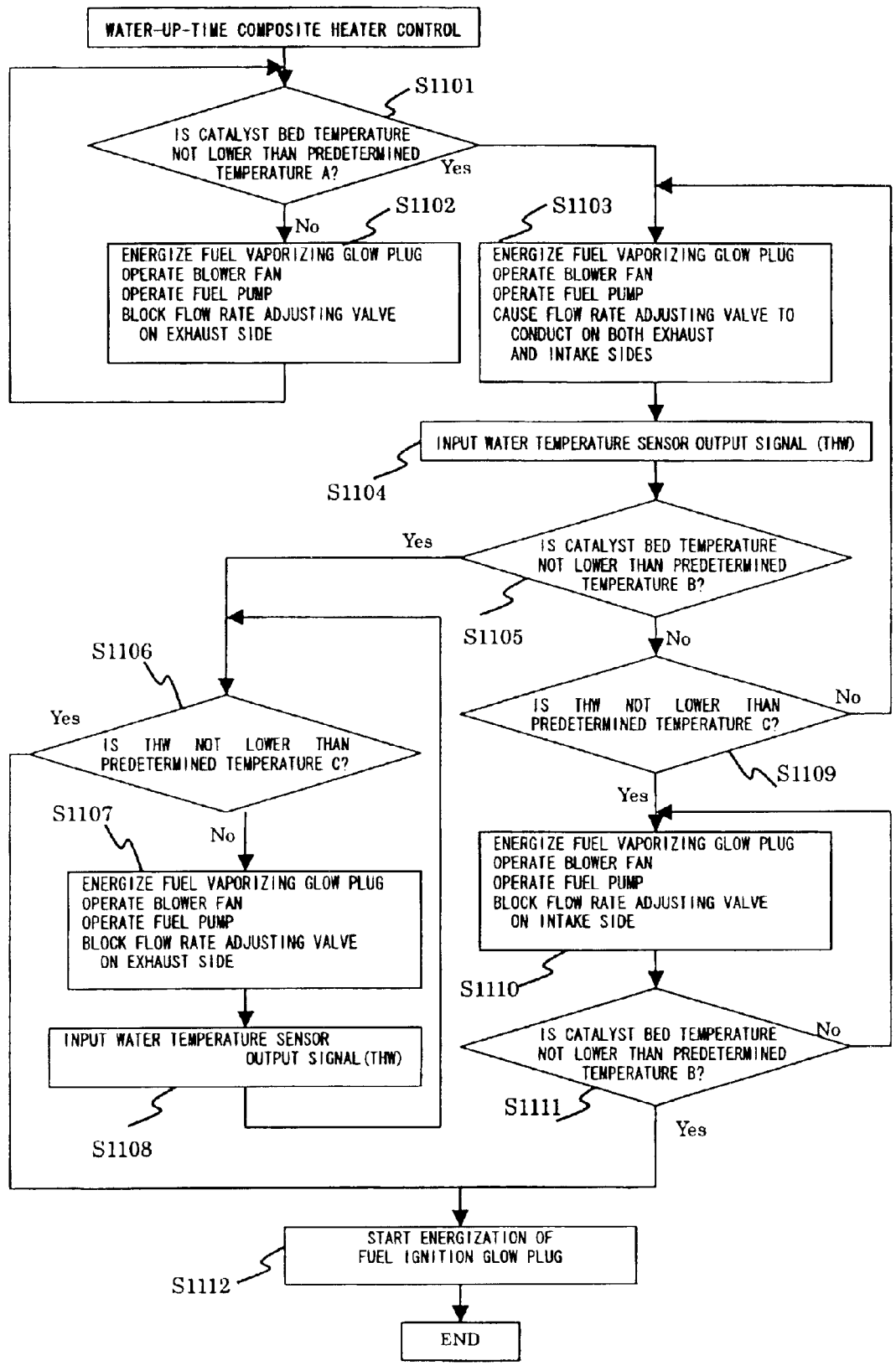
FIG. 11 is a flowchart showing a composite heater control routine for warming-up.

Here, the warm-up-time composite heater control, which is the method of controlling the combustion heater 14 in the above embodiment, will be described. In this case, the CPU 281 executes the warm-up-time composite heater control routine as shown in FIG. 11.

In the warm-up-time composite heater control routine, a judgment is first made in S1101 as to whether the catalyst bed temperature is equal to or higher than a predetermined temperature A. When the catalyst bed temperature is too low, the exhaust gas purifying catalyst is not activated at all; thus, if vaporized fuel is supplied from the combustion heater 14 to the exhaust gas purifying catalyst, there is the danger of the vaporized fuel being dissipated into the atmosphere without being oxidized (burned) by the exhaust gas purifying catalyst. This step is provided for the purpose of preventing this. Thus, the predetermined temperature A is a temperature condition for making a judgment, for example, as to whether the activation of the exhaust gas purifying catalyst has been started or not.

When it is determined in S1101 that the catalyst temperature is lower than the predetermined temperature A, it is determined that the activation has not been started in the exhaust gas purifying catalyst, and the procedure advances to S1102. In S1102, driving voltage is applied to the fan motor 150 of the combustion heater 14, the fuel vaporizing glow plug 152, and the fuel pump, and, at the same time, the flow rate adjusting valve 39 is controlled such that the exhaust gas from the combustion heater 14 is supplied solely to the intake side discharge passage 17a. Thereafter, the processing of S1101 is executed again.

When it is determined in S1101 that the catalyst temperature is higher than the predetermined temperature A, it is determined that the activation has been started in the exhaust gas purifying catalyst, and the procedure advances to S1103. In S1103, driving voltage is applied to the fan motor 150 of the combustion heater 14, the fuel vaporizing glow plug 152, and the fuel pump, and, at the same time, the flow rate adjusting valve 39 is controlled such that the exhaust gas from the combustion heater 14 is supplied to both the intake-side discharge passage 17a and the exhaust-side discharge passage 17b.

When the processing of S1103 has been executed, the procedure advances to S1104. In S1104, the output signal value (THW) of the water temperature sensor 31 is input to the CPU 281.

When the processing of S1104 has been executed, the procedure advances to S1105. In S1105, a judgment is made as to whether the catalyst temperature is equal to or higher than a predetermined temperature B. The predetermined temperature B is a temperature condition for making a judgment, for example, as to whether the entire exhaust gas purifying catalyst has attained a target activation temperature or not.

When it is determined in S105 that the catalyst bed temperature is equal to or higher than the predetermined temperature B, the exhaust gas purifying catalyst is considered to have attained the target activation temperature, and the procedure advances to S1106. In S1106, a judgment is made as to whether the cooling water temperature (THW) is equal to or higher than a predetermined temperature C. The predetermined temperature C is a temperature condition for making a judgment, for example, as to whether the warming-up of the internal combustion engine has been completed or not.

When it is determined in S1106 that the cooling water temperature (THW) is lower than the predetermined temperature C, it is not determined that the warming-up of the internal combustion engine has been completed, and the procedure advances to S1107. In S1107, driving voltage is applied to the fan motor 150 of the combustion heater 14, the fuel vaporizing glow plug 152, and the fuel pump, and, at the same time, the flow rate adjusting valve 39 is controlled such that the exhaust gas from the combustion heater 14 is supplied solely to the intake-side discharge passage 17a.

After the execution of the processing in S1107, the procedure advances to S1108. In S1108, cooling water temperature (THW) is input again to CPU 281. After the execution of processing of S1108, the procedures from S1106 onward are performed again.

When it is determined in S1106 that the cooling water temperature (THW) is equal to or higher than the predetermined temperature C, it is determined that the warming-up of the internal combustion engine has been completed, and the procedure advances to S1112.

Next, when it is determined in S1105 that the catalyst bed temperature is lower than the predetermined temperature B, the exhaust gas purifying catalyst is not considered to have attained the target activation temperature, and the procedure advances to S1109. In S1109, a judgment is made as to whether the cooling water temperature (THW) is equal to or higher than a predetermined temperature C.

When it is determined in S1109 that the cooling water temperature (THW) is lower than the predetermined temperature C, it is determined that the warming-up of the internal combustion engine has not been completed yet. That is, the exhaust gas purifying catalyst has not reached the target temperature, nor has the warming-up of the internal combustion engine been completed. Thus, in this case, the operations of from S1103 onward are executed again.

When it is determined in S1109 that the cooling water temperature (THW) is equal to or higher than the predetermined temperature C, it is determined that the warming-up of the internal combustion engine has been completed, and the procedure advances to S1110. In S1110, driving voltage is applied to the fan motor 150 of the combustion heater 14, the fuel vaporizing glow plug 152, and the fuel pump, and, at the same time, the flow rate adjusting valve 39 is controlled such that the exhaust gas from the combustion heater 14 is supplied solely to the intake-side discharge passage 17b. After the execution of the processing in S1110, the procedure advances to S1111. As in S1105, a judgment is made in S1111 as to whether the catalyst bed temperature is equal to or higher than the predetermined temperature B.

When it is determined in S1111 that the catalyst temperature is lower than the predetermined temperature B, the exhaust gas purifying catalyst is not considered to have attained the target activation temperature, and the procedures from S1110 onward are performed again.

When it is determined in S1111 that the catalyst temperature is equal to or higher than the predetermined temperature B, the exhaust gas purifying catalyst is considered to have attained the target activation temperature, and the procedure advances to S1112.

In S1112, the CPU 281 starts the application of driving voltage to the fuel ignition glow plug 153 of the combustion heater 14.

What is claimed is:

1. An internal combustion engine comprising:
   a combustion heater including:
      fuel ignition means for supplying a combustion gas; and
      fuel vaporizing means for vaporizing a fuel through heating for supplying a vaporized fuel;
   the internal combustion engine further comprising operation control means to control the combustion heater to selectively supply one of the combustion gas or the vaporized fuel to one of an exhaust passage or an intake passage of the internal combustion engine based on an operating condition of the internal combustion engine.

2. An internal combustion engine comprising:
   an exhaust gas purifying catalyst arranged in an exhaust passage of the internal combustion engine;
   fuel vaporizing means for vaporizing fuel through heating;
   vaporized fuel supply means for supplying the fuel vaporized by
   the fuel vaporizing means to an upstream side of the exhaust gas purifying catalyst in the exhaust passage without any burning of the fuel;
   fuel ignition means for supplying a combustion gas; and
   operation control means adapted to selectively supply one of the vaporized fuel or the combustion gas to one of the exhaust passage or an intake passage of the internal combustion engine based on an operating condition of the internal combustion engine.

3. The internal combustion engine according to claim 2, further comprising an exhaust gas re-circulation passage for circulating a portion of the exhaust gas from the exhaust passage on the upstream side of the exhaust gas purifying catalyst to an intake passage of the internal combustion engine,
wherein the vaporized fuel supply means is adapted to supply fuel vaporized by the fuel vaporizing means to the upstream side of the exhaust gas purifying catalyst in the exhaust passage through the exhaust gas re-circulation passage.

4. The internal combustion engine according to claim 1, further comprising vaporized fuel supply means, wherein the fuel vaporizing means and the vaporized fuel supply means are adapted to operate at least during a period until occurrence of complete explosion in the internal combustion engine.

5. The internal combustion engine according to claim 1, further comprising vaporized fuel supply means, wherein the fuel vaporizing means and the vaporized fuel supply means are adapted to operate at least during a period of time when the internal combustion engine is in a state of warm-up operation.

6. The internal combustion engine according to claim 1, wherein the fuel vaporizing means and the fuel ignition means are provided in a common combustion cylinder of the combustion heater.

7. The internal combustion engine according to claim 1, wherein the fuel vaporizing means includes a glow plug.

8. An internal combustion engine comprising:
a combustion heater equipped with a combustion chamber independent of the internal combustion engine;
gas supply means for supplying gas within the combustion chamber to an intake passage of the internal combustion engine; and
operation control means which is adapted to control the combustion heater so as to vaporize fuel supplied to the combustion chamber at least during a period until occurrence of complete explosion in the internal combustion engine without any burning of the fuel, and, at the same time, is adapted to control the gas supply means so as to supply the vaporized fuel in the combustion chamber to the intake passages;
and wherein the operation control means is further adapted to control the combustion heater to selectively supply one of the vaporized fuel or a combustion gas to one of an exhaust passage or an intake passage of the internal combustion engine based on an operating condition of the internal combustion engine.

9. The internal combustion engine according to claim 8, wherein the combustion heater includes:
fuel vaporizing means for vaporizing fuel through heating the fuel supplied to the combustion chamber; and
fuel ignition means for igniting the fuel vaporized by the fuel vaporizing means,
wherein the operation control means is adapted to operate only the fuel vaporizing means and the gas supply means during a period from a start of the internal combustion engine to occurrence of complete explosion therein.

10. An internal combustion engine comprising:
a combustion heater equipped with a combustion chamber independent of the internal combustion engine;
gas supply means for supplying gas in the combustion chamber to a position on an upstream side of exhaust gas purifying catalysts in an exhaust passage of the internal combustion engine; and
operation control means which is adapted to control the combustion heater so as to vaporize fuel supplied to the combustion chamber when it is necessary to supply reducing agent to the exhaust gas purifying catalyst, without any burning of the fuel, and, at the same time, is adapted to control the gas supply means so as to supply the vaporized fuel in the combustion chamber to the exhaust passage on the upstream side of exhaust gas purifying catalysts;
and wherein the operation control means is further adapted to control the combustion heater to selectively supply one of the vaporized fuel or a combustion gas to one of the exhaust passage or an intake passage of the internal combustion engine based on an operating condition of the internal combustion engine.

11. The internal combustion engine according to claim 10, further comprising an exhaust gas re-circulation passage for circulating a portion of the exhaust gas from the exhaust passage on the upstream side of the exhaust gas purifying catalyst to an intake passage of the internal combustion engine,
wherein the gas supply means is adapted to supply vaporized fuel in the combustion chamber to the upstream side of the exhaust gas purifying catalyst in the exhaust passage through the exhaust gas re-circulation passage.

12. The internal combustion engine according to claim 10, wherein the combustion heater includes:
fuel vaporizing means for vaporizing fuel through heating the fuel supplied to the combustion chamber; and
fuel ignition means igniting the fuel vaporized by the fuel vaporizing means, wherein the operation control means is adapted to operate only the fuel vaporizing means and the gas supply means, when it is necessary to supply reducing agent to the exhaust gas purifying catalyst.

13. The internal combustion engine according to claim 11, wherein the combustion heater includes:
fuel vaporizing means for vaporizing fuel through heating the fuel supplied to the combustion chamber; and
fuel ignition means for igniting the fuel vaporized by the fuel vaporizing means,
wherein the operation control means is adapted to operate only the fuel vaporizing means and the gas supply means, when it is necessary to supply reducing agent to the exhaust gas purifying catalyst.

14. The internal combustion engine according to claim 9, wherein the fuel vaporizing means and the fuel ignition means include independent respective glow plugs.

15. The internal combustion engine according to claim 9, wherein the fuel vaporizing means and the fuel ignition means include a single glow plug-adapted to switch between the vaporization and ignition of fuel according to a magnitude of a voltage applied to the glow plug.

16. The internal combustion engine according to claim 1, wherein the internal combustion engine is a compression ignition type internal combustion engine.

17. The internal combustion engine according to claim 6, wherein the internal combustion engine is a compression ignition type internal combustion engine.

18. The internal combustion engine according to claim 7, wherein the internal combustion engine is a compression ignition type internal combustion engine.

19. The internal combustion engine according to claim 14, wherein the internal combustion engine is a compression ignition type internal combustion engine.

20. The internal combustion engine according to claim 15, wherein the internal combustion engine is a compression ignition type internal combustion engine.

21. An internal combustion engine comprising:

a combustion heater equipped with a combustion chamber independent of the internal combustion engine;

gas supply means for selectively supplying gas from the combustion chamber to a portion on an upstream side of exhaust gas purifying catalysts in an exhaust passage of the internal combustion engine or to an intake passage of the internal combustion engine; and operation control means which is adapted to control the combustion heater so as to vaporize fuel supplied to the combustion chamber at least during a period until occurrence of complete explosion in the internal combustion engine, without any burning of the fuel, and, at the same time, is further adapted to control the gas supply means so as to supply the vaporized fuel in the combustion chamber to the intake passage, and which is further adapted to control the combustion heater so as to vaporize the fuel supplied to the combustion chamber when it is necessary to supply a reducing agent to the exhaust gas purifying catalyst, without any burning of the fuel and, at the same time, is adapted to control the gas supply means so as to supply the vaporized fuel in the combustion chamber to the exhaust passage;

and wherein the operation control means is further adapted to control the combustion heater to selectively supply one of the vaporized fuel or a combustion gas to one of the exhaust passage or an intake passage of the internal combustion engine based on an operating condition of the internal combustion engine.

22. An internal combustion engine comprising:

a combustion heater equipped with a combustion chamber independent of the internal combustion engine;

gas supply means for selectively supplying gas from the combustion chamber to a portion on an upstream side of exhaust gas purifying catalysts in an exhaust passage of the internal combustion engine or to an intake passage of the integral combustion engine; and operation control means which, at least during a period from a start to warm-up completion of the internal combustion engine, is adapted to control the combustion heater so as to vaporize fuel supplied to the combustion chamber without any burning of the fuel and, at the same time, is adapted to control the gas supply means so as to supply the vaporized fuel in the combustion chamber to the intake passage and the exhaust passage;

and wherein the operation control means is further adapted to control the combustion heater to selectively supply one of the vaporized fuel or a combustion gas to one of the exhaust passage or the intake passage of the internal combustion engine based on an operating condition of the internal combustion engine.

23. The internal combustion engine according to claim 12, wherein the fuel vaporizing means and the fuel ignition means include independent respective glow plugs.

24. The internal combustion engine according to claim 13, wherein the fuel vaporizing means and the fuel ignition means include independent respective glow plugs.

25. The internal combustion engine according to claim 12, wherein the fuel vaporizing means and the fuel ignition means include a single glow plug adapted to switch between the vaporization and ignition of fuel according to a magnitude of a voltage applied to the glow plug.

26. The internal combustion engine according to claim 13, wherein the fuel vaporizing means and the fuel ignition means include a single glow plug adapted to switch between the vaporization and ignition of fuel according to a magnitude of a voltage applied to the glow plug.

27. The internal combustion engine according to claim 8, wherein the internal combustion engine is a compression ignition type internal combustion engine.

28. The internal combustion engine according to claim 10, wherein the internal combustion engine is a compression ignition type internal combustion engine.

* * * * *

UNITED STATES PATENT AND TRADEMARK OFFICE
CERTIFICATE OF CORRECTION

PATENT NO. : 6,868,668 B2
DATED : March 22, 2005
INVENTOR(S) : Makoto Suzuki

It is certified that error appears in the above-identified patent and that said Letters Patent is hereby corrected as shown below:

Column 23,
Line 47, change "intake passages;" to -- intake passage; --.

Signed and Sealed this

Fourth Day of October, 2005

JON W. DUDAS
*Director of the United States Patent and Trademark Office*